(12) United States Patent
Koster

(10) Patent No.: US 7,520,429 B2
(45) Date of Patent: Apr. 21, 2009

(54) SYSTEMS AND METHODS FOR AN ELECTRONIC PROGRAMMABLE MERCHANDISE TAG

(75) Inventor: Karl Koster, Atlanta, GA (US)

(73) Assignee: United Parcel Service of America, Inc., Atlanta, GA (US)

(*) Notice: Subject to any disclaimer, the term of this patent is extended or adjusted under 35 U.S.C. 154(b) by 349 days.

(21) Appl. No.: 11/005,795

(22) Filed: Dec. 7, 2004

(65) Prior Publication Data
US 2005/0218218 A1 Oct. 6, 2005

Related U.S. Application Data

(60) Provisional application No. 60/558,446, filed on Mar. 31, 2004.

(51) Int. Cl.
*G06K 15/00* (2006.01)
(52) U.S. Cl. .................. 235/383; 235/378; 235/385
(58) Field of Classification Search .............. 235/383, 235/378, 385, 439
See application file for complete search history.

(56) References Cited

U.S. PATENT DOCUMENTS

| | | | |
|---|---|---|---|
| 5,151,684 A | 9/1992 | Johnsen | |
| 5,153,842 A | 10/1992 | Dlugos, Sr. et al. | |
| 5,245,534 A | 9/1993 | Waterhouse et al. | |
| 5,348,485 A * | 9/1994 | Briechle et al. | 439/110 |
| 5,537,126 A * | 7/1996 | Kayser et al. | 345/2.1 |
| 5,575,100 A * | 11/1996 | Marvin et al. | 40/642.02 |
| 5,619,416 A * | 4/1997 | Kosarew | 700/225 |
| 5,963,133 A | 10/1999 | Monjo | |
| 5,971,587 A | 10/1999 | Kato et al. | |
| 6,031,585 A | 2/2000 | Stevens | |
| 6,036,093 A | 3/2000 | Schultz | |
| 6,131,811 A * | 10/2000 | Gangi | 235/380 |
| 6,184,834 B1 | 2/2001 | Utsumi et al. | |

(Continued)

FOREIGN PATENT DOCUMENTS

DE  197 30 051 A1  2/1999

(Continued)

OTHER PUBLICATIONS

Office Action dated Mar. 17, 2008 from corresponding U.S. Appl. No. 11/105,925.

(Continued)

*Primary Examiner*—Seung H Lee
(74) *Attorney, Agent, or Firm*—Alston & Bird, LLP

(57) ABSTRACT

Systems and methods are disclosed pertaining to a programmable display tag that displays consumer information, such as pricing information. The tag is typically portable microcomputer controlled device containing its own power source, memory, and input keys and displays information on an display, typically a color or black and white LCD screen. The programmable display tag is remotely programmed by a display management system that communicates display data using a wireless protocol, such as the IEEE 802.15.4 based protocol. A wireless application protocol allows the display management system to read and write display data, as well as control various administrative functions. Typical applications include remote updating of prices for goods in a retail environment, such as a grocery store, but the display tag can used for other applications, such as a portable display device to display text, graphical, or animated displays for consumers, industrial, shipping, marketing, or other applications.

21 Claims, 24 Drawing Sheets

U.S. PATENT DOCUMENTS

| | | |
|---|---|---|
| 6,243,690 B1 | 6/2001 | Adamec et al. |
| 6,244,511 B1 | 6/2001 | Vandenberg et al. |
| 6,271,814 B1 * | 8/2001 | Kaoh .......................... 345/82 |
| 6,450,407 B1 * | 9/2002 | Freeman et al. ............. 235/492 |
| 6,680,452 B2 | 1/2004 | Takizawa |
| 6,721,617 B2 | 4/2004 | Kato et al. |
| 6,753,830 B2 | 6/2004 | Gelbman |
| 6,806,924 B2 | 10/2004 | Niiyama et al. |
| 2001/0020935 A1 | 9/2001 | Gelbman |
| 2002/0167500 A1 | 11/2002 | Gelbman |
| 2003/0014143 A1 | 1/2003 | Kato et al. |
| 2004/0012485 A1 | 1/2004 | Sundqvist |
| 2004/0143354 A1 | 7/2004 | Kato et al. |
| 2004/0166823 A1 | 8/2004 | Alderton |
| 2005/0171662 A1 * | 8/2005 | Strege et al. .................. 701/33 |
| 2005/0218218 A1 | 10/2005 | Koster |
| 2006/0164327 A1 | 7/2006 | Rosander et al. |
| 2007/0152045 A1 | 7/2007 | Erickson et al. |

FOREIGN PATENT DOCUMENTS

| | | |
|---|---|---|
| EP | 1345116 A1 | 9/2003 |
| WO | WO 00/16189 | 3/2000 |
| WO | WO 00/67110 A | 11/2000 |
| WO | WO 02/063602 A1 | 8/2002 |
| WO | WO 02/071382 A1 | 9/2002 |
| WO | WO 2004/021239 | 3/2004 |

OTHER PUBLICATIONS

International Search Report from corresponding International Application No. PCT/US05/012518 dated Mar. 24, 2006.

Office Communication from corresponding U.S. Appl. No. 11/105,926 dated Jun. 18, 2008.

Office Communication from corresponding U.S. Appl. No. 11/105,925 dated Jul. 29, 2008.

Office Action dated Nov. 14, 2008, U.S. Appl. No. 11/105,926, filed Apr. 13, 2005.

Office Action dated Nov. 12, 2008, U.S. Appl. No. 11/105,925, filed Apr. 13, 2005.

Office Action dated Apr. 1, 2008, U.S. Appl. No. 11/105,924, filed Apr. 13, 2005.

* cited by examiner

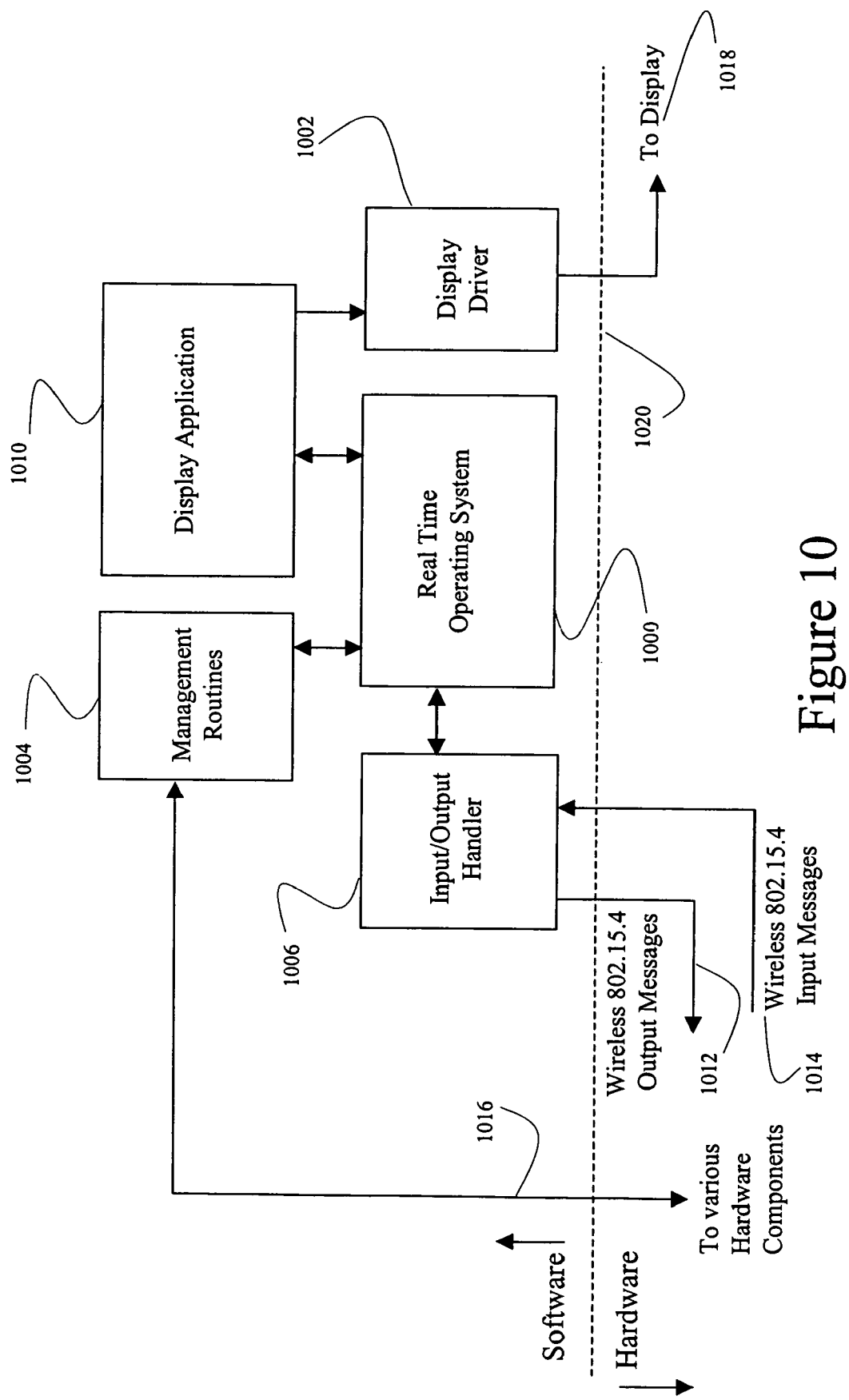

Format of DTP Messages:

Operation Type ( Message Type [parameter 1, parameter 2,.... ])

| Level | Examples | Function |
|---|---|---|
| Operation Type: | Request | Invokes an operation; response expected |
| | Response | Provides a response to previous Request |
| | Unidirectional | Conveys data without requiring a Response nor in response a previous Request |
| Message Type: | Read | Returns data as indicated by parameter |
| | Write | Writes data as indicated by parameter |
| | Acknowledge | Acknowledges previous message or operation |
| Parameters: | Display Line 1 | Pertains to first line of display |
| | Display Line 2 | Pertains to second line of display |
| | Battery Level | Indicates power level of battery |
| | Serial Number | Indicates serial number of display tag |

Figure 12

Display Related Data

| Field | Type | Example Value |
|---|---|---|
| 1611 — Regular Price | Price | $1.38 |
| 1612 — Description | Text | House Brand Pudding |
| 1613 — Size | Alphanumeric | 6 oz. |
| 1614 — Brand | Text | House Brand |
| 1615 — Nutritional Information | Text | High in calcium |
| 1616 — Advertising Text | Text | Special Holiday Sale! |
| 1617 — Sale Price | Price | $1.09 |
| 1618 — Sale Price Start | Time/Date | 7:00 a.m. July 3, 2003 |
| 1619 — Sale Price End | Time/Date | 11:59 p.m. July 4, 2003 |

Figure 16b

Display Tag Related Data

| Field | Type | Example Value |
|---|---|---|
| 1630 — Tag Number | Numerical | 01233456789 |
| 1631 — Product Model | Numerical | 12345-922 |
| 1632 — Start Date | Date | May 20, 2003 |
| 1633 — Battery Install | Date | June 5, 2002 |
| 1634 — Battery Level | Numerical | .90 |
| 1635 — Self Test Results | Text | Okay |

Figure 16c

SYSTEMS AND METHODS FOR AN ELECTRONIC PROGRAMMABLE MERCHANDISE TAG

RELATED APPLICATIONS

This application claims the benefit of provisional U.S. patent application Ser. No. 60/558,446, filed on Mar. 31, 2004.

FIELD OF THE INVENTION

This invention generally relates to electronic programmable display tags that are remotely programmed to indicate prices for merchandise. Specifically, systems and methods are disclosed pertaining a wireless programmable electronic display, that is portable and self powered. The merchandise tag provides human readable information, such as price information, in association with merchandise. The merchandise display tag is programmed using wireless messages transmitted by a remote display management system. The display management system may further interface with an inventory control system, point of sale, RFID readers, or other business system. This facilitates automated updating of price information on the remote display tags. A remote portable terminal may be used to augment administration of the display tags.

BACKGROUND

Retail businesses are typically required by state law to post prices for merchandise ('goods' or 'items') offered for sale. One approach is to price each item individually with price tags. The price tags are often paper-based, and affixed to the merchandise using adhesive labels. This requires that each item be individually marked. For many businesses, the marking of each individual item is labor intensive and the associated cost may be significant with respect to the selling price of the merchandise. This approach can be cost prohibitive, or at the least undesirable for many businesses. For example, in hardware stores and grocery stores, individual marking of items is disadvantageous.

An alternative approach, typically used by grocery stores, is to place the goods on a shelf with a price tag mounted on the shelf in the proximity with the items. The price tag is typically located on shelf near the merchandise displaying the retail price. The items themselves may have a retail price printed on the merchandise by the manufacturer, or at least have a bar code that is read by a scanner upon checkout, which retrieves the pricing information from an inventory database. This approach requires that a single price tag be provided on the shelf and avoids having to individually mark each item. For some businesses, such as grocery stores, this is the normal method of indicating prices to the consumer.

However, this approach is manually intensive to accommodate changes in prices. Store personnel must affix the prices to shelves. Further, many stores discount items periodically by advertising sales and this requires new, temporary price tags to be displayed on the shelves. Further, once the items are 'off sale' and return to the regular price, the sale price tags must be removed. In many states, consumer laws or store policies dictate that if the items are advertised at a sale price, they must be sold at the labeled price, even if the sale has ended. Thus, the retailer must ensure that the prices are updated in a timely manner or experience adverse economic impacts.

Further, retailers typically provide more than just the price of the goods to consumers. Typically, an internal SKU (stock keeping unit) number and description is included on the price tag so that store personnel know what item should be stocked at that location. Depending on the retail environment, the price tag may also indicate the name of the brand, distributor, and other information. For example, in a grocery store application, the price tag may also indicate the unit price (e.g., price per pound) of the item. Of course, should a manufacturer change their packaging weight, a new and updated label must be provided.

It is evident that retailers must expend significant resources to keep price tags current as well as accurately reflecting temporary sale prices. Should prices increase, or any data on the price tag change, the old tags must be removed and the new tags provided. Thus, a method of providing a more economical and more flexible approach for displaying price and other consume information is needed.

SUMMARY

These and other benefits are realized in the present invention that provides a programmable display tag ('tag') that can be remotely programmed using a wireless communications interface, such as by utilizing the IEEE 802.11 or 802.15.4 based series of wireless communication specifications. A small transceiver in the wireless display receives updated information, including regular price, sale price, and other consumer information. The unit has a display, typically based on LCD technology, providing the information to the consumer. A display management system allows updating information, either individually for a specific tag, or on a batch basis, using wireless communication links. The updated information may be provided by a remote system communicating with the display management system or the display management system may be integrated into inventory control systems or other business systems. The display tag may communicate with the display system controller using one of the IEEE 802.11 or 802.15.4 based wireless communication links, or other wireless protocols. The choice of the wireless communication link impacts the throughput and the power requirements of the display device in part. Depending on the application and power availability, each embodiment has relative advantages.

A remote terminal may also be used to facilitate administration of the display tag. The remote terminal typically is used by store personal to administer price data at the location of the display tag, so that administration can be done on a portable basis.

BRIEF DESCRIPTION OF THE DRAWINGS

FIG. 10 illustrates one embodiment of the software architecture of the display tag.

FIG. 12 illustrates one embodiment of an application layer protocol for communicating between the display management system and the display tag.

FIGS. 16b and 16c illustrate one embodiment of the display data records maintained by the display management system.

DETAILED DESCRIPTION

Figure 1:
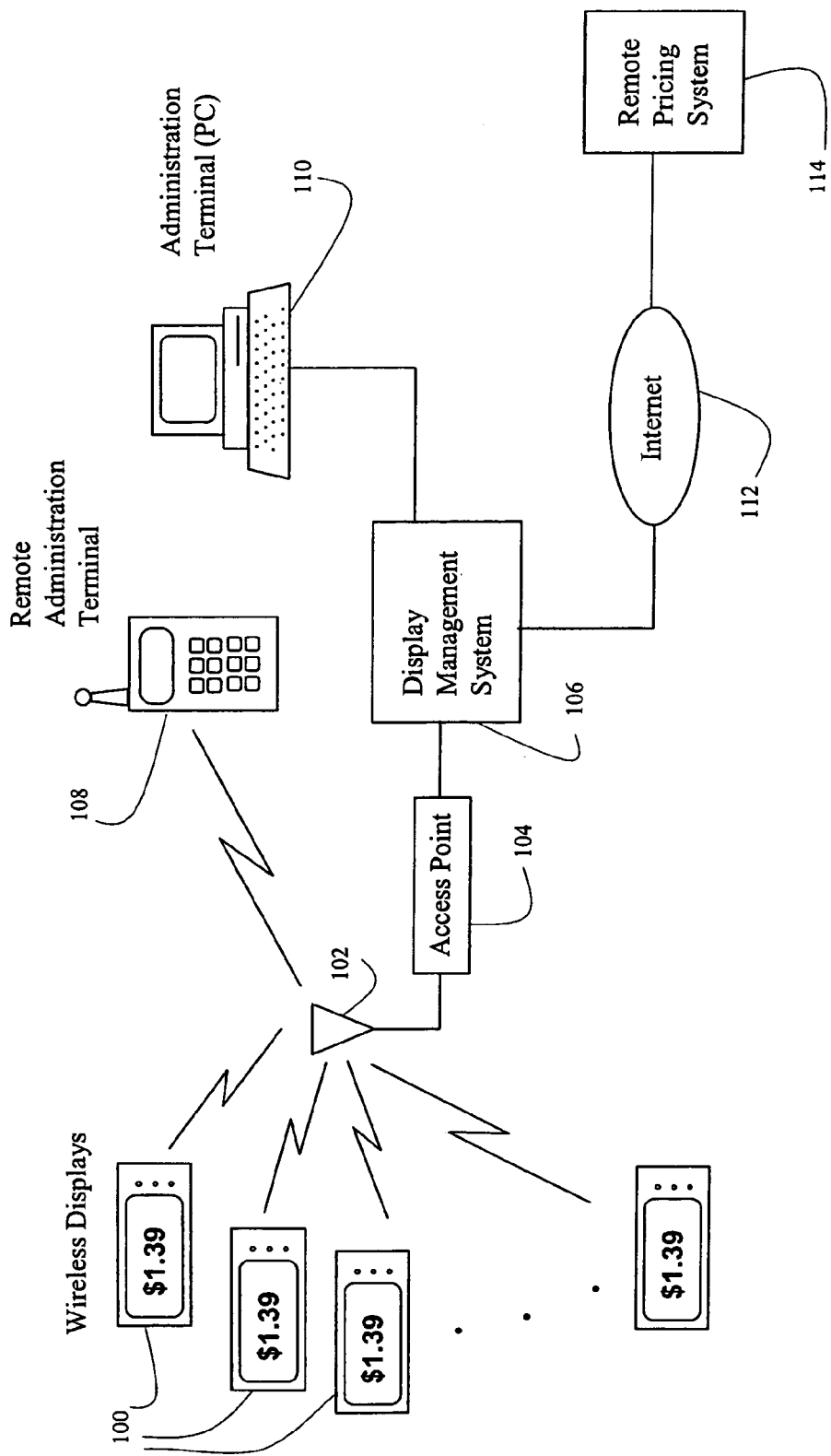
FIG. 1 illustrates one embodiment of a programmable display system according to the principles of the present invention.

As required, a detailed illustrated embodiment of the invention is disclosed herein. However, the operating structures and processes associated with the illustrated embodiment of the invention may be altered in other embodiments, in a wide variety of forms, some of which may differ significantly from the disclosed embodiment. Consequently, the specific structural and functional details disclosed herein are merely representative; yet in that regard they are deemed to afford the best embodiment for disclosure and to provide a basis for the claims herein, which define the scope of the present invention.

The present inventions will now be described more fully with reference to the accompanying figures, in which some, but not all embodiments are shown. In various figures, similar elements are illustrated multiple times, but are not necessarily numbered in every instance so as to make the figures easier to comprehend. Like numbers refer to like elements throughout the figures. In some instances, different terms may refer to the same element.

The present inventions generally pertain to using electronic programmable merchandise display tags for providing information to a consumer. The programmable display tags ("tags", "display tags") incorporate a display, typically a LCD display, for providing human readable text and/or graphical information, typically regarding a product. The information may be static (e.g., a price) or the information may be graphical and animated (e.g., demonstrating a use of the product or providing animated marketing graphics). The tag's display information is determined by a display management system (DMS) that typically controls a plurality of tags, all of which are typically located in a common location (e.g., retail store). The DMS communicates with the tags using standard wireless communication protocols, such as those defined by the IEEE 802.11 or 802.15 families of wireless protocols, although other wireless protocols may be used.

The tags can be used to provide various types of information to persons for various applications. Many of the embodiments illustrating the principles of the invention herein describe an application in which pricing information is displayed, however, other types of information may be provided such as supplemental product information, related products, sales or discount information, or general advertising information. A typical application would involve placement of display tags as a replacement for paper based price tags in a grocery store, although many other applications are possible, including warehousing applications, assembly line applications, stockroom applications, etc. For example, the display tags could be used in a warehouse application to indicate to a person the contents of a storage bin. The display tags could be used in a conference room or convention center environment to display information pertaining to a certain meeting scheduled for a conference room. The display tags could be temporarily attached to an item on an assembly line displaying instructions for assembling or handling of the item. Although the following disclosure illustrates using programmable tags in a grocery store application to illustrate the principles of the present invention, the principles of the present invention are not limited to this application or to the specific technology used.

FIG. 1 illustrates some of the components of one embodiment of the present system, which is described in the context of a grocery store. Typically, a plurality of programmable display tags 100 are dispersed throughout the grocery store. These are typically placed on the shelves in proximity with the goods that they are associated with. The tags are in wireless communication with a display management system (DMS) 106 that controls the display tags. The wireless communication is accomplished using an antenna 102 connected to an access point 104. There is a corresponding antenna incorporated into the display (not shown). The wireless communication typically uses a standard wireless protocol, such as one of the IEEE 802.11b, IEEE 802.11g, or IEEE 802.15.4 based protocols. Other wireless protocols, such as 'bluetooth' based protocols can be used. These typically operate in the "unlicensed" spectrum defined by FCC part 15 rules. For example, in the U.S., the ISM band (e.g., 915 MHz or 2.4 GHz) can be used, although other frequencies may be used in other countries. Further, some of the wireless protocols (such as 802.11) have variations (e.g., 802.11b, 802.11g) that are within the scope of the present invention. However, licensed spectrum may be used as well. Other embodiments are possible utilizing and/or adapting any of the various 3G wireless communication protocols used for telecommunications.

The 802.145.4 wireless protocol operates using a carrier sense multiple access (csma) scheme and is designed for low latency, low power applications. Further information can be obtained from the IEEE organization and in particular the 802.15.4 specification that is incorporated by reference into this application.

While the DMS conveys information for display on the tags, an administrative user ("administrator") may interact with the DMS to individually control or administer the displays tags. The administrator typically interfaces with an administration terminal or PC 110. The administration PC typically is a personal computer functioning as a client to the DMS, which acts as a server. In other embodiment, the administrative terminal could be simply an input/output device the service. In still other embodiments, the administrator may interact using a portable handheld terminal 108. The portable terminal may augment or replace the functionality of the administration PC. Typically, the DMS and administration terminal are located in the same retail store, such as in the administrative offices of the grocery store. However, the administration PC may be located in a remote location while the access point (radio transceiver) 104 and antenna 102 are located in the grocery store. Typical functions accessed by the administrator include inspecting (reading) the current display data associated with a tag, updating (writing) display data to a tag, adding additional tags to the system, and various other administration functions that will be detailed. The administration PC also establishes authorization of a portable terminal to access and administer the display tags. Thus, the administration PC is a 'master' user that can limit the functions available to a given remote portable terminal.

A remote portable administration terminal 108 ("portable terminal" or "remote terminal") may be used with the system. This typically is a hand held portable unit that is able to communicate with the DMS. It typically has limited keypad input allowing a user to provide text and numerical data. It further includes a display. It offers the administrator many, if not all, the functions available at the administration terminal. While the administration terminal 110 allows interaction with the DMS from a single (but fixed) location, the remote administration terminal allows store personal to interact with a display tag while the person is located at the tag. Thus, a store clerk may be notified that a particular tag requires updating or replacing, and the store clerk may use the remote administration terminal to update the contents of a particular tag without having to physically return to the administrative office to use the administrative terminal. In many cases, the administrative office may be located in a remote portion of the store. In other installations, the portable administration terminal may be not be utilized and any changes are accomplished by using the display management system and the administrative terminal.

The above components may comprise a basic system for managing display tags in a retail store, but typically the system interfaces with other business systems. For example, in the embodiment shown in FIG. 1, the DMS interfaces with the Internet 112 to allow communication with the remote pricing system 114. In this embodiment, the grocery store receives price updates from a remote system. The remote pricing system may incorporate various functions, including inventory management or stock reordering functions. In the embodiment of a grocery store application, typically, the remote pricing system is operated by a regional or metropolitan headquarter office or other administrative office that determines prices and or sales on certain goods in the grocery store. For example, a chain of grocery stores in a single metropolitan area may have common prices for certain goods. Those prices are determined at the remote pricing system, as well as weekly sale prices. This information is included in a data file that is sent via the Internet (or other communication network, such as LAN, WAN, VPN, X.25, frame relay or other data service) to each grocery store in the region for updating prices on merchandise. Specifically, the regional administrative office may reduce the price of an item(s) according to a planned sale and transmit the pricing change information to the grocery store's DMS system to automatically adjust the prices displayed. This allows remote, real time pricing adjustments to the display tags. One prime application is using the display tags associated with certain commodity items in which the prices change often as a result of market conditions (e.g., the price of a gallon of milk).

Alternative embodiments are possible that are not illustrated in FIG. 1. For example, the DMS may be incorporated into an inventory management system or a point-of-sale system in the grocery store. Alternatively, the DMS could be integrated into a remotely located system. Those skilled in the art of retail information and processing systems will readily recognize that many variations are possible.

Figure 2:
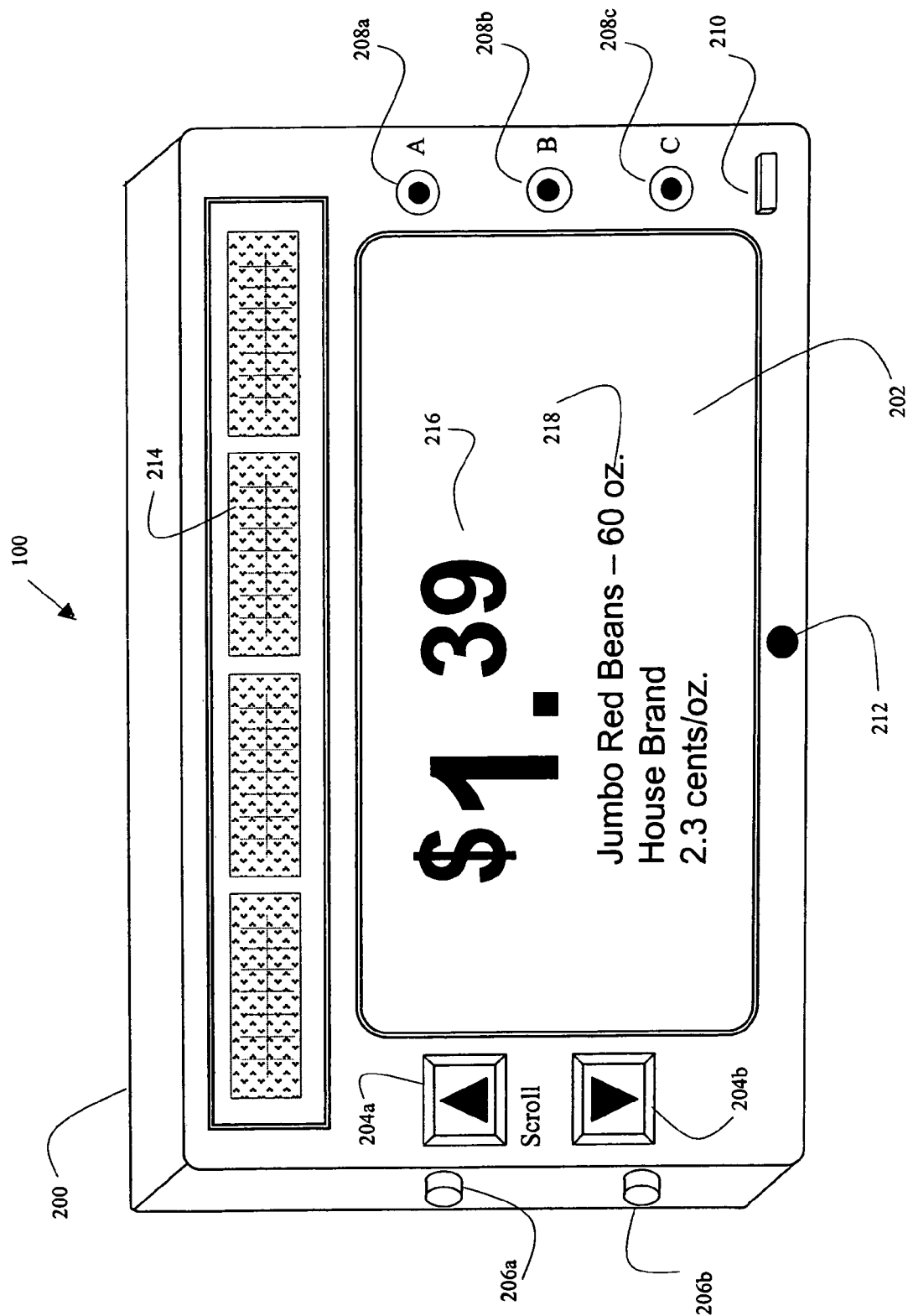
FIG. 2 illustrates one embodiment of a programmable merchandise tag according to the principles of the present invention.

FIG. 2 illustrates one embodiment of a programmable display tag 100 in further detail. The tag is typically housed in a plastic case 200. The case is typically rectangular and accommodates the display 202. The display is typically a black/white or color LCD display that can be of at least two types. One type of LCD display uses predefined segment shapes, as typically found in LCD based digital clocks. This is suited for displaying a numerical price. Another type is a bit or pixel based display, where individual pixels may be controlled. This type is typically incorporated into laptops, cell phones, and PDA devices and is more flexible with respect to shapes, fonts, and images that can be displayed. Various size fonts can be intermixed and various effects can be added as well. In the embodiment illustrated in FIG. 2, it is presumed that the display 202 is a bit mapped or pixel-based display.

The embodiment of the display tag of FIG. 2 illustrates various optional capabilities that may be present individually or in combination. For example, two scroll buttons 204a, 204b are illustrated and designed for the user (e.g., consumer) to interact with; typically these allow a user to scroll up or down for the purposes of viewing additional information presented on the display. The scrolling may occur incrementally (e.g., one line at a time) or by presenting a new page. One typical application is to provide additional information in conjunction with the item for sale. In a grocery store application, a second display page may be presented to the user indicating nutritional information, recipe information, regular versus sale price, country of origin, manufacturer, etc. The scroll buttons allow navigation of multiple display pages to present more information to a user than can be displayed on a single screen image.

Several input switches or buttons are also illustrated. These are labeled as "A" 208a, "B" 208b, and "C" 208c. These inputs buttons may be used by the consumer as 'soft keys' or may have dedicated or programmable functions utilized by the store personal. These may or may not operate in conjunction with a LED display, illustrated here as a small rectangular LED 210. The input buttons or the LED may be associated with self test functions, diagnostic purposes, etc. Alternatively, the input buttons may operate in conjunction with the display, as part of soliciting user input for menu options. For example, the display may provide an icon near each button indicating the function associated with the button. The icons may change based on the application program (these are typically known as 'soft keys' since the meaning may be programmed to mean different functions at different screens). Thus, in lieu of the scroll button 206a, 206b implemented via hardware inputs, logical labels (e.g., an up or down arrow icon) could be presented in association with a button. 'Soft key' functions can be programmed in software as opposed to the scroll buttons 206a, 206b that are fixed in hardware.

Alternatively, additional input switches 206a, 206b may be used for testing and/or self-diagnostic purposes. As indicated, not all input switches may be present in an embodiment, or they may be implemented in different numbers or forms, in different locations, or for different purposes.

An infrared or photocell detector 212 may be incorporated as a motion detector to detect the presence of a person that has stopped in front of the display or that is interacting with the display. Such a detector may be useful to gather marketing information (such as maintaining traffic counts) to determine where foot traffic in a store is most common or least prevalent. Further, the display tag can monitor the number of instances a consumer pauses in front of the tag, and this can be used measure the effectiveness of the display data in capturing the attention of a consumer. The data may be stored in memory in the display tag, along with the time, and downloaded to the DMS upon command. The DMS could then prepare graphical maps indicating the foot traffic over time, or other time based representations of the relative traffic distribution in the store.

Further, the tag could be programmed to display an alternative page when a user stops in from of the display. Alternatively, the detector may be used to control power levels in the display. For example, when no light is detected, the unit may limit information displayed (e.g., deactivating the display) to save battery power. Alternatively, the unit may go into a sleep mode based on the absence of ambient light.

Finally, an array of solar cells 214 may be integrated into the display tag case. The incorporation of solar cells represents one aspect of a power management scheme that may be associated with the tag. Using solar cells allows rechargeable batteries to be used, or alternatively the solar cells could be used as the main source of power. Other options are possible, and they will be discussed subsequently as part of the power management schemes.

The display shown illustrates two main types of information on the default display image. The default display image is the image that which is normally displayed to a customer. In this embodiment it comprises a price 216 of the goods and a description of the goods 218. The price is typically in a larger font that is visible by the average consumer at a distance of several feet. The price provides what is typically the primary information to be provided to the customer. In different applications, other types of information may be displayed by the electronic display tag. The description of the goods typically comprises several lines of information. In the present embodiment, the description comprises text associated with the description of the item and its size, the brand or manufacturer associated with the goods, and finally, a comparative price is provided. The information displayed may be more or less determined by the retailer. The information could also include, for example, a stock or SKU number (which can also be displayed in bar code format on the display), distributor, or other information used by the merchant. Alternatively, the information could be provided on an additional display screen image that is presented when one of the scroll keys or input buttons is pressed. The use of a bit map display provides flexibility as to what information is provided and how it is formatted.

The information presented can be logically divided into multiple independent or linked screen images. For example, the consumer information: illustrated in FIG. 2 could be viewed as a single logical screen image that is the default image displayed by the tag. Additional screen images could be defined, such as a nutritional screen image(s) (which are not shown in FIG. 2), which could comprise multiple linked screen images. The user, pressing the scroll buttons, could scroll through the images consecutively. Upon time out (i.e., indicative of no further interaction by the user), the display tag could then revert back to the default display image.

Figure 3:
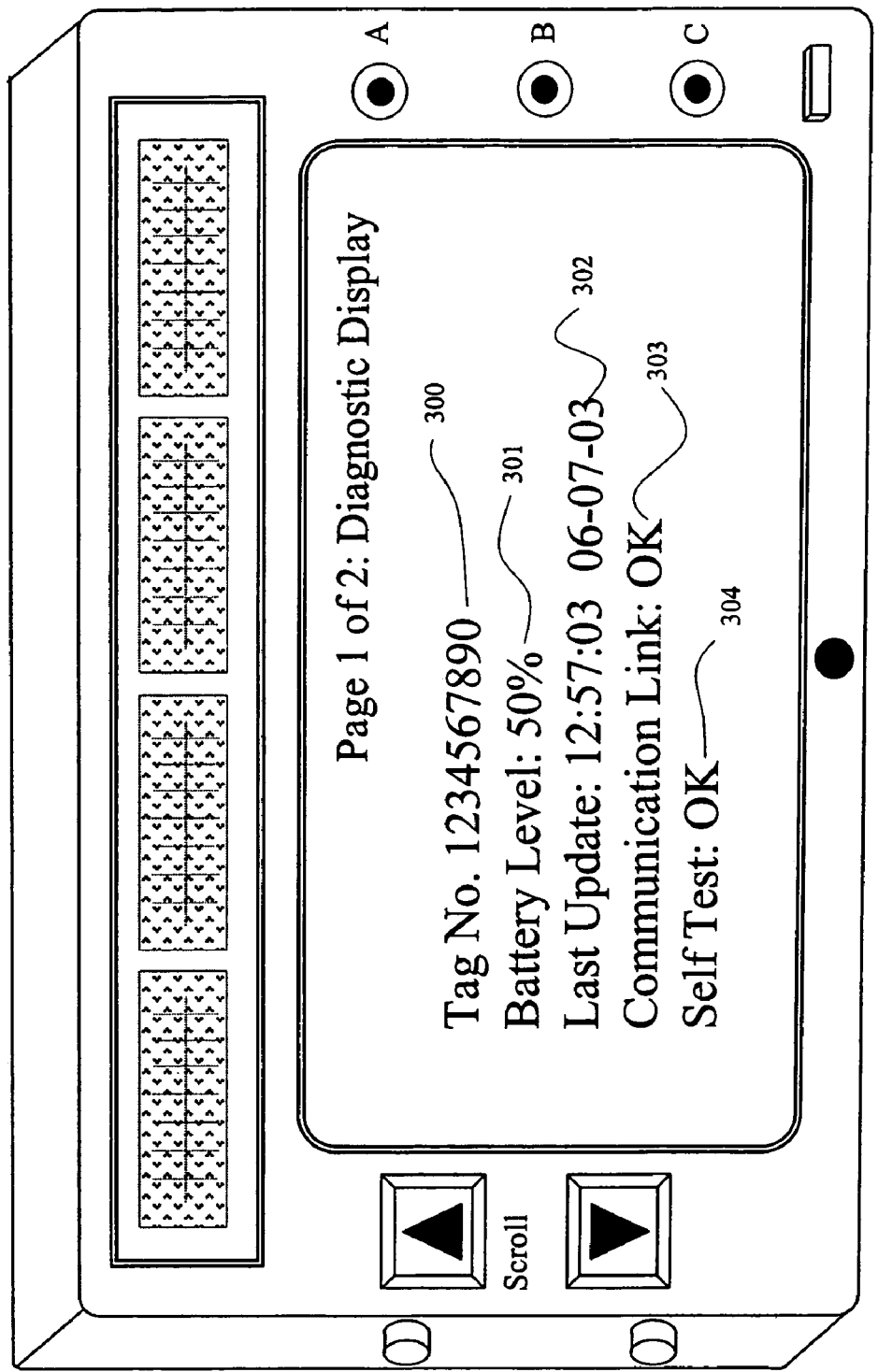
FIG. 3 illustrates one embodiment of an administration display screen image according to the principles of the present invention.

FIG. 3 illustrates another display screen image illustrating operational information. This includes operational, administration, and maintenance (OA&M) information used by maintenance or store personal to manage the use of the display tags. This type of information is typically displayed when the tag is in an administrative or self test mode (this will be discussed subsequently). FIG. 3 illustrates some common types of administrative information that could be displayed in one embodiment. The tag number 300 illustrates a numerical value uniquely associated with the display tag. This value is typically stored in non-volatile memory in the tag, as well as in memory in the DMS, and unique identifies the tag. In order to program display data for display on a given physical tag, as well as identify a tag, each display tag is provided a unique number. This number could correspond, for example, to an address or subset of the address used by the wireless communications protocol to communicate with the tag. For example, the tag number (e.g., address) could be the MAC level address used by the MAC protocol layer to uniquely identify the display tag. Such addresses are well known to those familiar with LAN communication protocols and are designed to be unique based on the numbering scheme defined. The battery level indicator 301 is useful for indicating the battery power level, if the unit is designed for battery operation. This provides a visual indication if the unit requires new batteries or if recharging is required of the batteries. The next line 302 indicates the time and date that the tag received update data to be displayed. This may be useful to determine whether the display tag is displaying the most current information. For example, a recent update may indicate that the tag is displaying the most current data contained in the display management system. The next line 303 indicates the status of the communication link. Thus, a radio link failure can be detected and displayed for personnel to diagnose potential problems. Finally, a self-test indication 304 is provided. The display tag could also display diagnostic messages or identifiers should any abnormal problem occur or be detected, such as bad memory, transceiver problems, high error rates, etc. Other information could be displayed, such as radio signal strength and other parameters useful for trouble shooting or debugging errors. Because the display is capable of displaying various messages, inherent flexibility is provided for informing users of various conditions.

The initiation of a self-test and/or the display of such information may occur upon pressing an input button, such as the side button 206a or 206b of FIG. 2. Upon completion of the self-test, the unit could display the information upon further input, or present the data on the display by default. Then, the primary default screen image would be presented after a time-out or upon explicit input via a control button.

Figure 4:
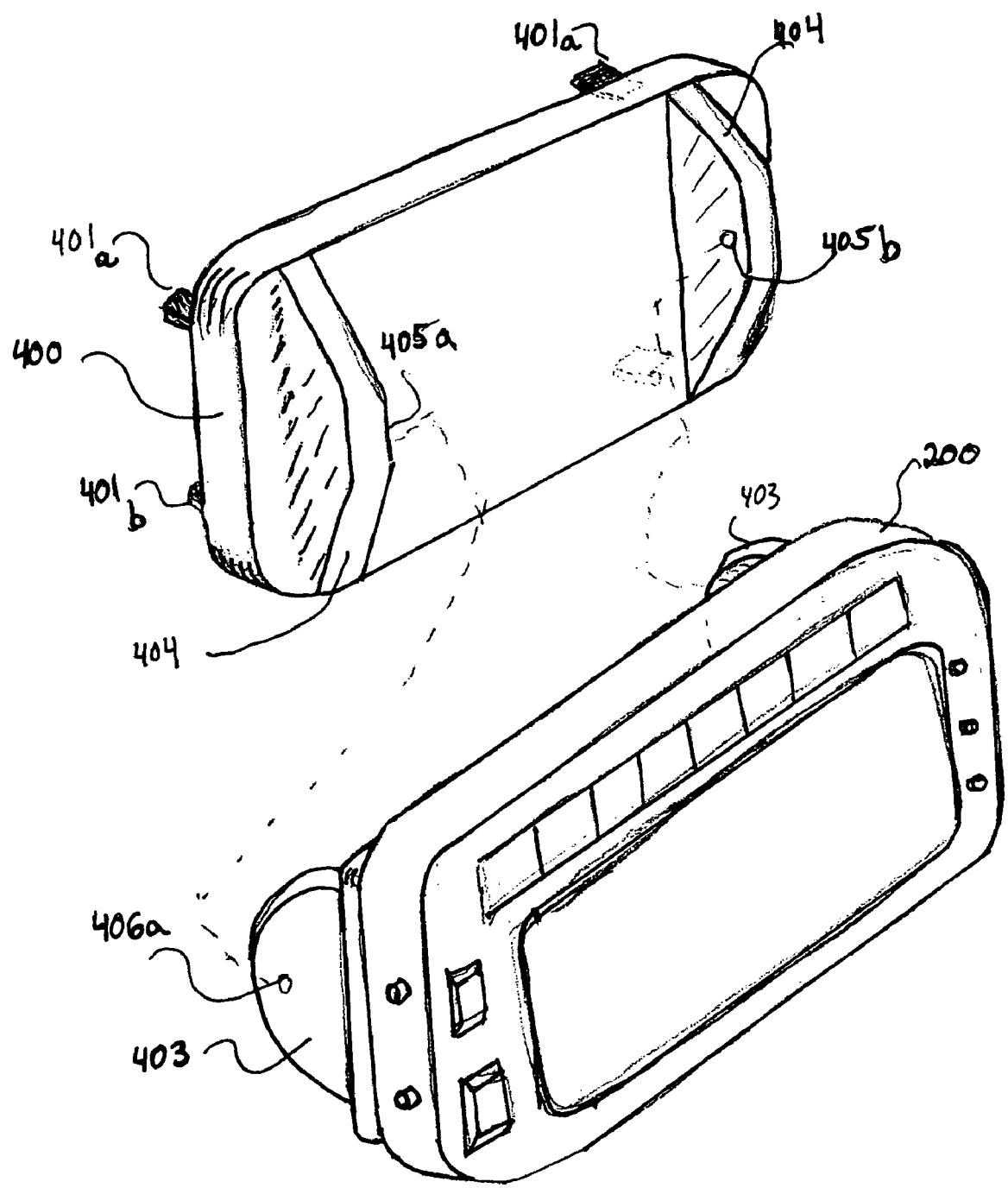
FIG. 4 illustrates a perspective view of the display tag and base member of one embodiment according to the principles of the present invention.

FIG. 4 illustrates another embodiment of the display tag. In this embodiment, there are two components of the display tag. The main display tag unit 200 includes two semi-circular side members 403 that mate with two protruding member 404 of a base unit 400. The base unit 400 functions as a base that is affixed to a shelf and also incorporates a plurality of metal connectors 401. In this embodiment, four connectors 401 are illustrated in an arrangement with two above 401a and two below 401b. These connectors function to affix the base unit to the shelf and serve as power connectors for conducting power. The power is provided to two metal connectors 405a, 405b. These, in turn, mate with metal connectors 406a attached to the side member 403. This mating typically occurs by positioning the display tag 200 with the base member 400 so that the connectors are held in place by friction. This allows the tag to be moved or removed, but allows it to maintain some stability.

Figure 5:
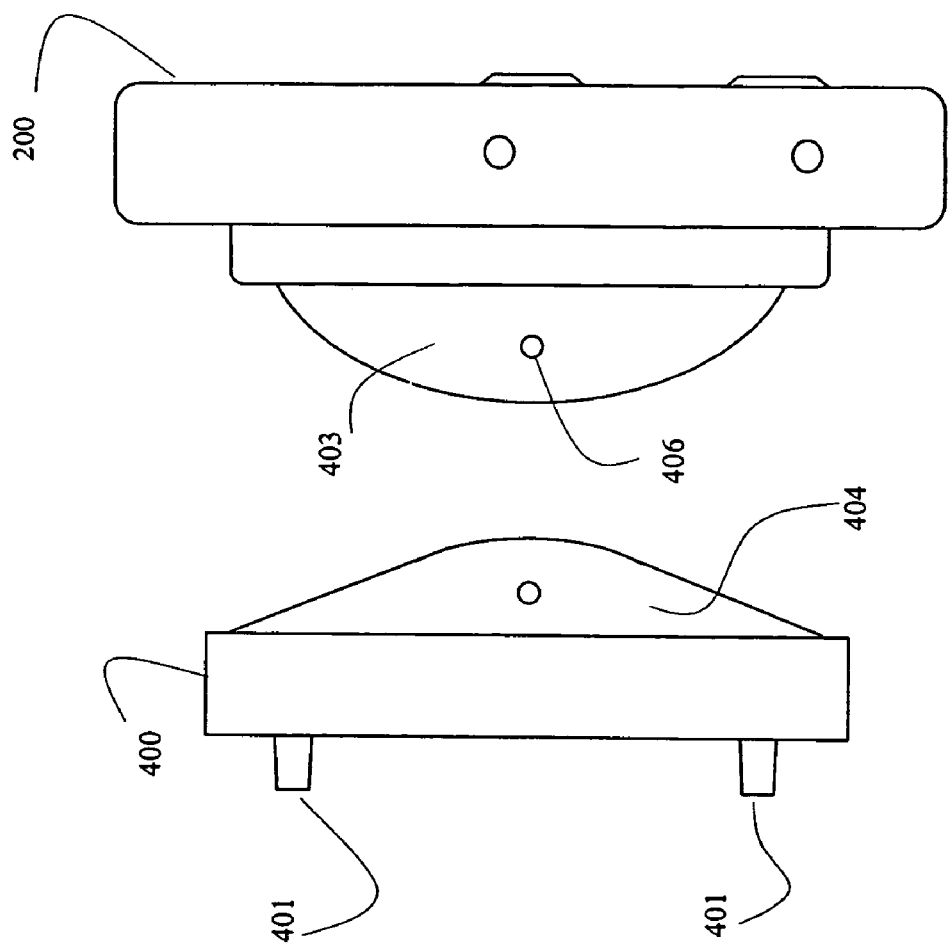
FIG. 5 illustrates a side view of the display tag and base member of one embodiment according to the principles of the present invention.
Figure 6:
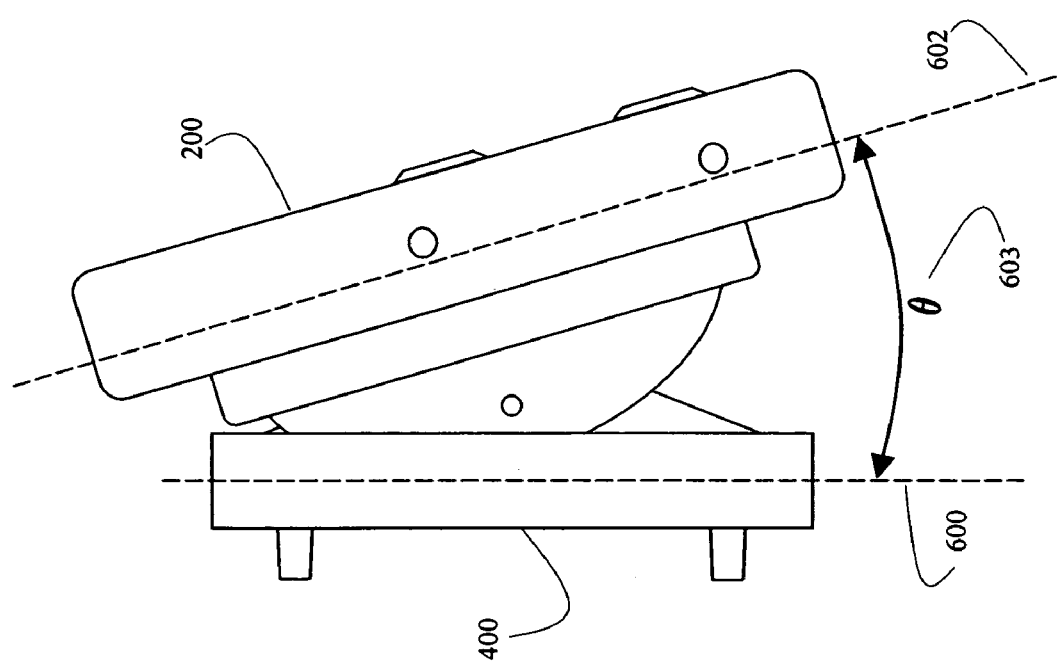
FIG. 6 illustrates another side view of the display tag and base member of one embodiment according to the principles of the present invention.

A side view is depicted in FIG. 5. In FIG. 5, the display tag 200 is positioned parallel to the same plane as the base member 400. FIG. 6 illustrates the base member 400 and the display tag 200 mated. The metal connectors 406, 405 allow the display tag 200 to pivot while still receiving power provided from the base member 400. The pivoting action of the display facilitates presentation of the display when affixed to shelves having a low height or high height relative to the viewer.

In FIG. 6, the base unit 400 is typically attached to a shelf in a perpendicular manner 600 and the display tag 200 is tilted in a plane 602 at an angle θ 603 to optimize viewing of the display. Similarly, if the display tag is located above the typical viewing angle of the consumer, the unit could be tilted downward. Alternatively, in other embodiments, the display tag may be non-movable and affixed at a height designed to be easily viewable by an average adult.

Figure 7:
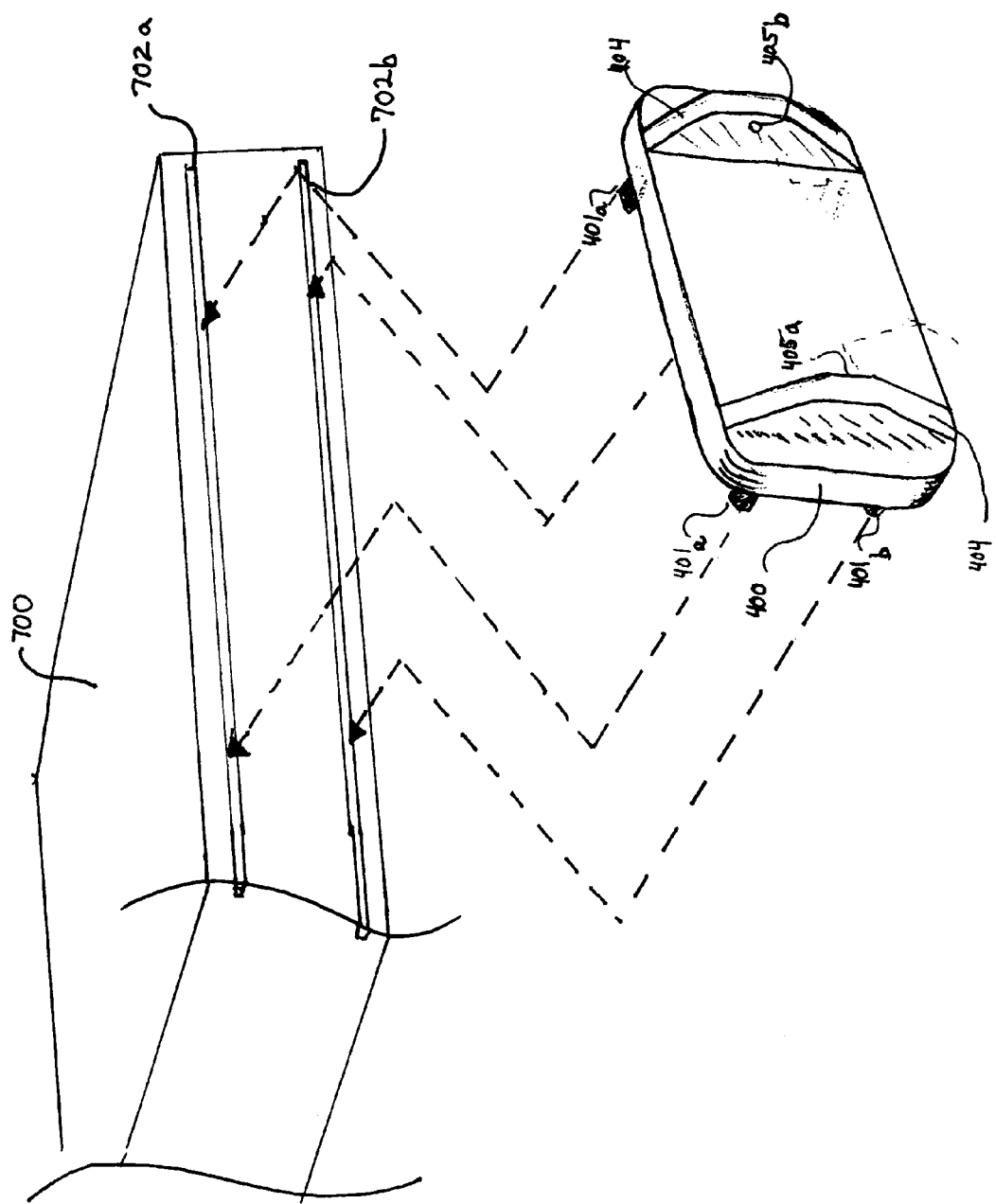
FIG. 7 illustrates one embodiment of mounting the base member to a display shelf according to the principles of the present invention.

FIG. 7 illustrates how the base unit 400 attaches to a shelf 700 where the shelf incorporates power strips 702. The power strips comprise two strips, typically an upper strip 702a and a lower strip 702b that are integrated in the front of the shelf. The strips are recessed and are energized with a low operative voltage to apply power to the pins 401 in the base member 400. The pins 401 are inserted into the strip by friction and hold the display tag in position. By having a continuous strip on the shelf, the display tag can be easily moved laterally to position the tag with the merchandise.

In alternative embodiments, the base member 400 may incorporate storage for batteries. These batteries, as will be discussed subsequently, could be rechargeable batteries or non-rechargeable (disposable) batteries. The based member could have a cover that is snapped into position to hold the batteries in place (not shown). The batteries could be of any common size or shape, including AAA cylindrically shaped batteries, or the 'button' shaped (e.g. "hearing aid type") batteries. Typically the base and display cases are made of injection molded plastic and those skilled in the art will recognize that a variety of shapes can be easily made, including the ability to integrate metal connectors and provide accessible battery compartments.

Hardware Architecture

Figure 8:
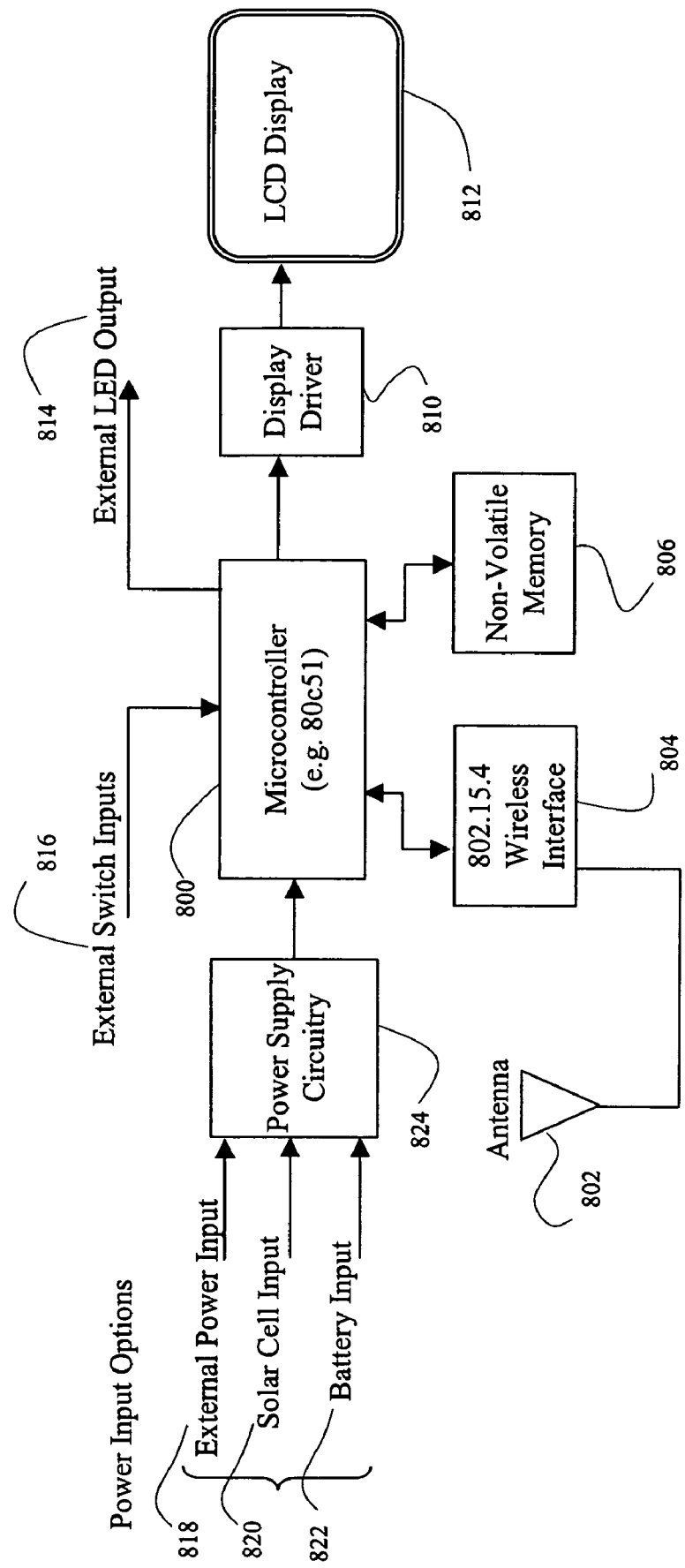
FIG. 8 illustrates one embodiment of the hardware components comprising the display tag.

Turning now to the architecture of the display tag itself, FIG. 8 illustrates one embodiment of the potential architecture that can be used to construct the display tag. Those skilled in the art will recognize that integrated circuits have been historically rapidly changing so that the separate functions do not necessarily correlate to separate integrated circuits. In FIG. 8, a major component of the system is the micro-controller 800. The micro-controller is a microprocessor, typically with integrated input/output, support circuitry, memory (both volatile and non-volatile), clock circuitry, and potentially A/D or D/A functions (these are also known as single chip microcomputers, such as those based on the Intel 8048 series of microcomputers or the 8051 or other commonly known variations). The micro-controller stores and executes a program that responds to commands and or display data that is transmitted wirelessly from the display management system and provides the appropriate control signals to the display 812. Although a micro-controller is disclosed in the embodiment illustrated, a microprocessor or dedicated processor for wireless communications could be used (such as the Qualcomm 6200 series of wireless processors) or other special purpose processors with integrated RF communication oriented functions could be used.

The display 812 is an LCD display that can be monochrome or color, depending on the application. For price tag applications, a monochrome display may be suitable, while for other applications, such as presenting marketing information, a color LCD display may be utilized. A display driver circuit 810 is illustrated, although this may be integrated into the micro-controller or integrated with the display. In one embodiment, the purpose of the display controller is to off-load the display control functions from the micro-controller.

The micro-controller obtains the information that is displayed by the receiving messages received via the antenna 802. These messages typically contain retail information, such as price data, product description data, icons, graphic images, etc. and the message is typically transmitted by the display management system. The radio signals are processed by an 802.15.4 transceiver. In other embodiments, an 802.11b or other 802.11 based wireless communications link transceiver can be used, as well as bluetooth, TDMA, CDMA, or other wireless transmission schemes. The transceiver provides the received digital data to the micro-controller, which executes a software program that analyzes the data. The transceiver also allows the micro-controller to send information to the display management system using the transceiver.

The micro-controller 800 receives local switch inputs 816 fro the various switch inputs on the display tag as previously disclosed. The switch inputs are shown as a single input in FIG. 8, but may correspond to a plurality of separate switch inputs. The number and type and function may vary based on a particular embodiment. The micro-controller may provide dedicated outputs for an LED 814 that are used for various functions (e.g., self test, indication of power, indication of RF signal strength, etc). The use of a separate LED as a form of visual output may appear redundant to having an LCD display, but the LED can provide a form of visual backup indication in cases where the display is non-functional. For example, in executing a self-test in the display tag, the absence of a display may be due to a non-functioning display or a non-functioning microprocessor (or other component). Use of the LED as an output indicator allows the operator to easily verify that the unit has power, the microprocessor is functioning, or that the unit is receiving data wirelessly even though the display is not indicating any information. This may assist in isolating a problem with the operation of a display tag.

The power input to the system is provided by the power supply circuitry 824. The power supply circuitry is illustrated as receiving several types of power input. In various embodiments, one or several types of inputs may be used, although typically only one of the alternatives is used. FIG. 8 illustrates the power supply circuitry 824 receiving power from an external power source 818. This power input option can correspond to using an external power supply rail as previously disclosed. Alternatively, the power supply circuitry may receive power from solar cells 820. In this embodiment, the solar cells may be integrated with the display tag as previously discussed. Finally, a self-contained battery 822 may provide the input power. The batteries may be rechargeable, and receive their recharging power from the solar cell input, or the batteries may be disposable, non-rechargeable batteries. As discussed, the batteries may be of the 'button type' that can be concealed in the housing of the display tag, or alternatively in a based to which the display tag attaches to. Typical embodiments with batteries use self-contained, easily replaceable batteries.

The choice of power and the power management scheme varies based on the power requirements of the chips used. For example, an 802.11-based interface is not optimized for low power operation (as compared to 802.15.4), so that an external power rail system may be required. In other schemes, rechargeable batteries are used in conjunction with solar cells to provide power for the display tag operation. The display tag may be limited to transmitting data or receiving data during certain times as a power savings scheme. Other display tags, such as those built using the IEEE 802.15.4 wireless standard, are designed to consume little power and may operate on disposable batteries for many months. The power consumption is impacted in part on how frequently the displays are updated. For example, display tags, which are updated every day, will consume more power than display tags where are updated once a week.

Network Architectures

Figure 9:
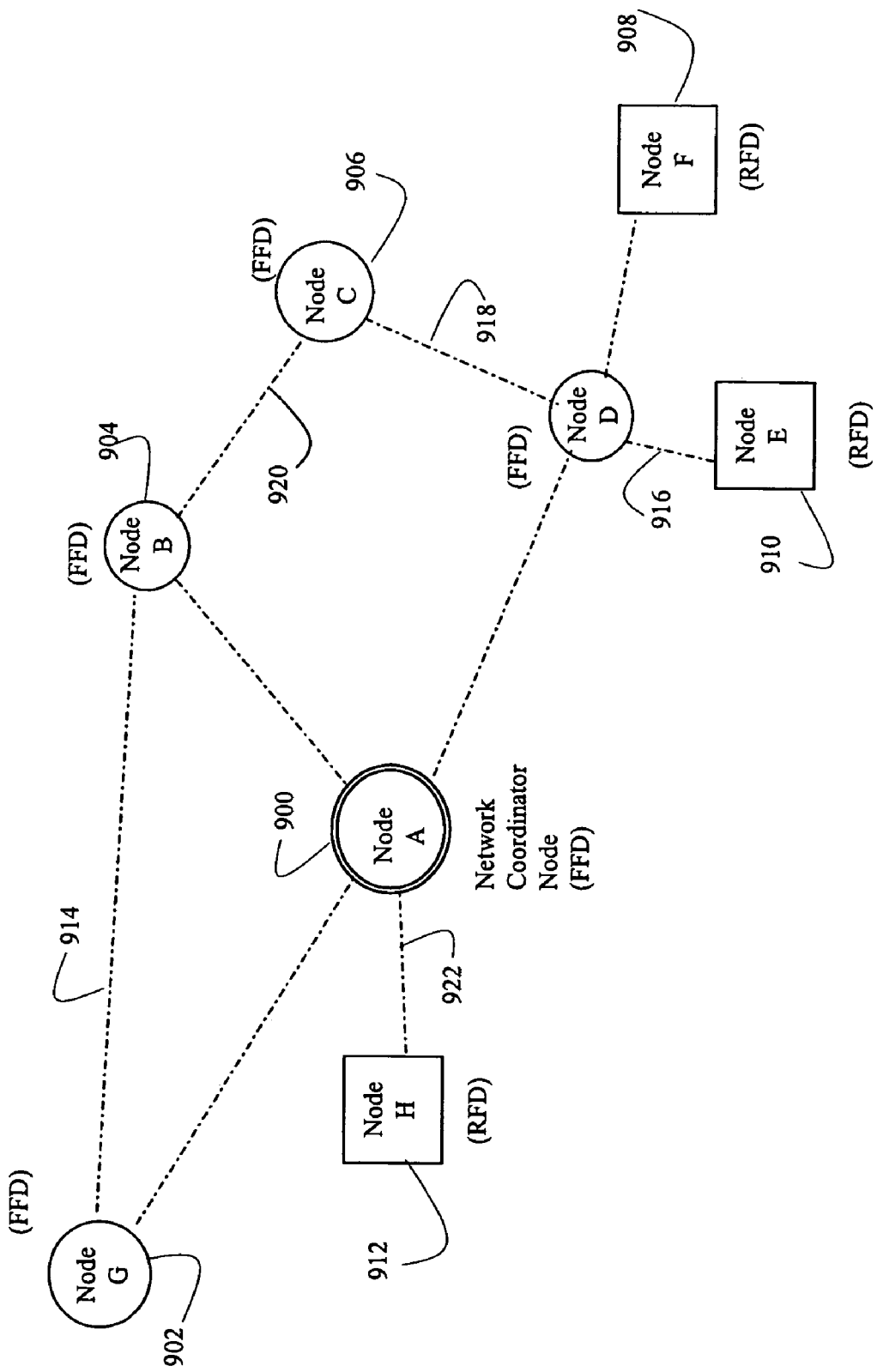
FIG. 9 illustrates an embodiment of the network architectures supported by the display tag.

The wireless display tag typically communicates with the Display Management System on a point-to-point communications link. In the embodiment in which 802.15.4 is used as a means of communication, additional network topologies are possible. In FIG. 9, some of the topologies are disclosed. In FIG. 9, there are three types of nodes illustrated. Node A 900 is a Network Coordinator Node, which is a 'full function node' ("FFD"). The network coordinator maintains overall knowledge of the network (or a portion thereof). It typically is the most sophisticated and requires relatively more computer power and memory, though this still can be implemented using a single chip micro-controller. This acts as a master network coordinator, and overlaying this architecture onto FIG. 1, the Display Management System (along with the access point) could be viewed as functionality corresponding to the Network Coordinator Node. Node G 902, Node B 904, Node C 906, and Node D 916 are Client Nodes that are also full function nodes. These Nodes can function as information sinks and sources, but can also relay information from another client node. This type of device is also considerd a FFD. The Client Node E 910 and Client Node H 912 are information sources or sinks, but do not relay information. These are typically used as network edge devices and require relatively lower computational and memory storage requirements. Thus Node H and Node E are reduced functionality nodes ("RFD"). The architecture of 802.15.4 allows up to a total of 2**16 or about 64K nodes in a network. Typically, the maximum amount of nodes are not deployed in a given embodiment, but for applications such as retail pricing, where there may be thousands of items (e.g., a typical grocery store has thousands of items), the 802.15.4 architecture supports the DMS communication with many display tag devices.

The ability for client nodes to act as relays to other client nodes means that the 802.15.4 network as a whole can be viewed as a "mesh" network, where each client node acts as a network node. For example, Node F 908 may be out of RF range from Node G 902, but Node F can communicate with Node D 916, which can relay the data over link 918 to node C 906, which can relay the data over link 920 to Node B 904, which can relay the data over link 914 to Node G 902. This is an example of a mesh network.

When the client nodes directly communicate with a network coordinator node, a 'star' architecture is achieved. When client nodes, such as Node E 910 and Node F 908 communicate via Node D to the Network Coordinator, this is an example of a 'cluster' architecture. The 802.145.4 allows all three architectures to be used. Thus, in one embodiment of the present invention, a plurality of display tags communicate directly with the DMS, using a 'star' architecture. However, since 802.15.4 typically has a range of 30 to 70 meters, which is dependent on the environmental conditions, the "cluster" or "mesh" architecture is possible and useful to extend the effective range of the communication between the tags and the DMS. Thus, the display tags could be deployed in a large warehouse environment, or a large retail store environment where the DMS is located more than 30 meters from the farthest display tag. Because other display tags can function as relays, the effective limitation is that any display tag must be within 30 meters of another display tag, which can relay information back to the DMS. This would require that the display tag be built as a full function node. This may increase the memory and processing requirements, so that alternatively, the display tags may be built as reduced function client nodes, and dedicated relay nodes may be deployed in the store in strategic locations acting as relays. In this embodiment, slightly simpler and less expensive client nodes (display tags) more than justify the placement of a few more expensive full function relay nodes.

Software Architecture

Turning now to the software architecture of the display tag, FIG. 10 illustrates one embodiment of the major software functions. In FIG. 10, Various software functional groupings are illustrated and are represented as being above a dividing line 1020 separating software functions from the operation of hardware components (below the line). Various software functions may be implemented in firmware, so that this representation does not necessarily preclude a hardware implementation or alternatives.

In FIG. 10, the Real Time Operating System (RTOS) 1000 functions as a mini operating system optimized for real time processing that coordinates the operation of the various other software functions, including input/output operations. Such real-time operating systems are well known in the art of micro-controllers. The functionality of the RTOS may incorporate some of the other software functions, such as the input/output handler 1006. The input/output handler routine functions to send and receive application level messages according to the appropriate communications protocols. This may include the various protocol data unit formats associated with the display tag protocol messages (discussed subsequently). Depending on the embodiment, the lower layers of the wireless protocol layers may be implemented in firmware associated with the wireless transceivers.

The RTOS communicates with the Programmable Display Tag Application ("Display Application") 1010 that performs the various functions associated with displaying the information on the display, processing inputs, and controlling the programmable display tag. Typically, this application is compiled and stored in non-volatile memory. The programmable display application 1010 communicates with a display driver 1002 that formats the display information as required for the LCD display. This is, of course, dependent on the architecture embodying the principles of the present invention. In alternative embodiments, the Display Driver 1002 functionality may be integrated with the RTOS or may be integrated into firmware associated with the display. The RTOS also communicates with a Management Application 1004 that facilitates managing the hardware aspects of the display tag.

The relationship and roles of the various software applications can be illustrated by way of example. Messages to 1014 and from 1012 the display tag are processed by a receiver, such as an 802.11b, 802.11g, or 802.15.4 based transceiver. Other wireless communications protocols may be used, such as "bluetooth", or any of the wireless communication protocols (e.g., W-CDMA, CDMA20001x EV-DO, GPRS, TD-CDMA, infrared, etc.). Other wireless based communications links can be used, but these are some of the more common alternatives. The messages are provided to/from a semiconductor integrated circuit(s) implementing the wireless communication protocols and protocol data units. The messages 1014 from the wireless transceiver circuitry are provided as input to the I/O Handler 1006. The I/O Handler parses the message and provides the message to the RTOS 1000 processing. Based on the message received, the RTOS will route the message to either the Display Application 1010 or the Management Routine 1004 based on the type of message. In one embodiment, an explicit indication may be conveyed in the message indicating whether the RTOS should route the message to the Management Routine 1004 or the Display Application 1010. Alternatively, all messages could be routed to the Display Application and it could decide which messages are destined for it versus those, which should be routed to the Management Routine. Again, the Display Application could perform this based on the explicit indication or based on the message.

A core function of the display application is to process wireless communication application level message that control displaying information on the display tag. Typical messages received by the Display Application include messages updating the display, commanding a battery power level measurement and a response message indicating the same, responding with a message indicating the current display contents, etc. If the Display Application receives an "Update Display" command message from the DMS, for example, the Display Application will send the information to be updated to the Display Driver 1002, which then updates the display using the appropriate display signals 1018. At that point, the messages are processed at the hardware level, which is indicated as occurring below the lines 1020.

If the RTOS determines that the received message is a Management Routine message, the message is then passed to the Management Routine 1004. The Management Routine processes the message. Such messages may require interaction with various hardware components as represented via line 1016. The Management Routines incorporate self-test and diagnostic related capabilities, and are not generally used in the normal updating of display information. For example, one management function involves verifying the identify of the display tag and this is associated with one management message requests the display tag to report back its serial number and/or MAC address.

When the Display Application 1010 requires transmitting a message to the Display Management System (such as in response to a command to read the display data), the Display Application sends the data to the RTOS 1000, that then communicates with the Input/Output handler 1006, which then in turn communicates the data to the IEEE 802-based transceiver 1012 and the information is transmitted using radio waves to the Display Management System.

As noted, variations are possible in the software architecture. The Display Application could incorporate the Management Routines as well as the Display Driver functionality. In addition, the RTOS could parse and generate the messages by incorporating the functionality of the Input/Output handler. However, segregating the functionality allows integration of separate software modules and facilitates the development of the system.

Wireless Protocol Messages

Figure 11A:
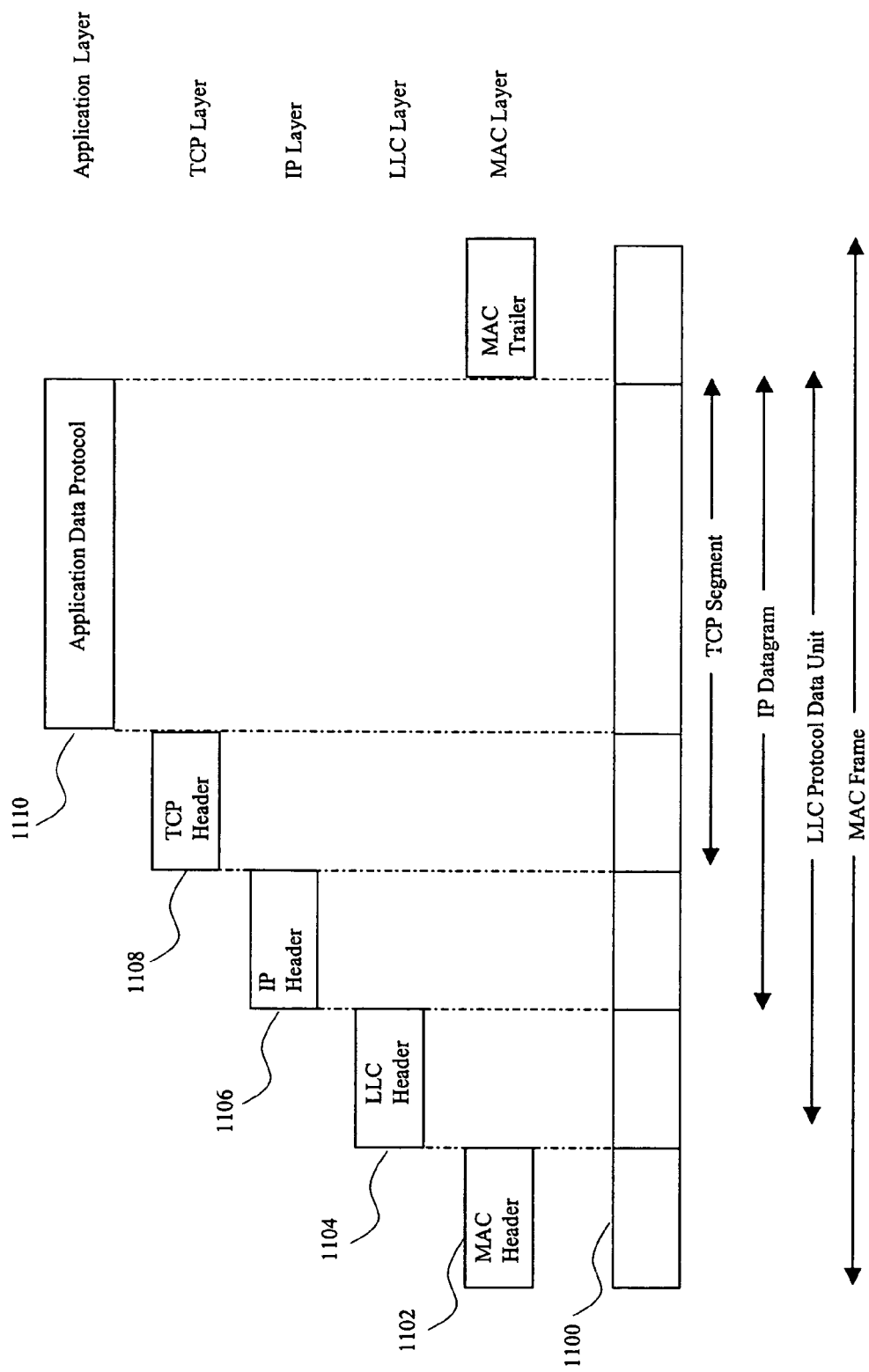
FIGS. 11a and 11b illustrate two embodiments of the protocol layer architecture used for communicating between the display management system and the display tag.

The application level messages acted upon by the Display Application 1010 are communicated using the 802.11 or 802.15.4 based wireless protocols by conveying application level protocol data units. This is accomplished by using a layered message architecture that is illustrated in FIG. 11a. FIG. 11a illustrates one embodiment of the various protocol layers associated with the 802.11 based wireless communication, which is similar to that used in LANs and well known to those skilled in the area of data communications. The MAC layer 1102 (in which the corresponding protocol data unit is called the MAC frame 1100) controls access to the wireless communication medium. The Logical Link Control (LLC) layer 1104 provides a ink layer structure to the bit stream and carries the IP protocol data units. The IP layer 1106 provides routing and addressing of messages to various network nodes and the TCP layer 1108 provides transmission control procedures. Finally, the application layer 1110 is conveyed. Each of these layers and associated procedures are well known in the art and are typically available using off-the-shelf technology. The use of the TCP/IP facilitates interworking with the Internet, which also uses a TCP/IP layered architecture.

The Application Data Protocol layer (also called "Application Layer") is where the messages are defined between the Display Management System and the Display Tag to allow the two to interact. The particular protocol defined is called the Display Tag Protocol (DTP). The DTP protocol is a relatively simple protocol, and variations are possible as will be readily appreciated by those skilled in the art transaction processing. The DTP could be based on existing protocols, such as the X.408/X.409 remote operations protocol for invoking remote operations. Alternatively, the DTP could be based on a simple Request/Response transaction operation conveying message types with the appropriate parameters. Further, the DTP could incorporate a formatting language, such as XML, to convey the images to be displayed, as well as other data (e.g., audio files, graphical images, etc.).

Figure 11B:
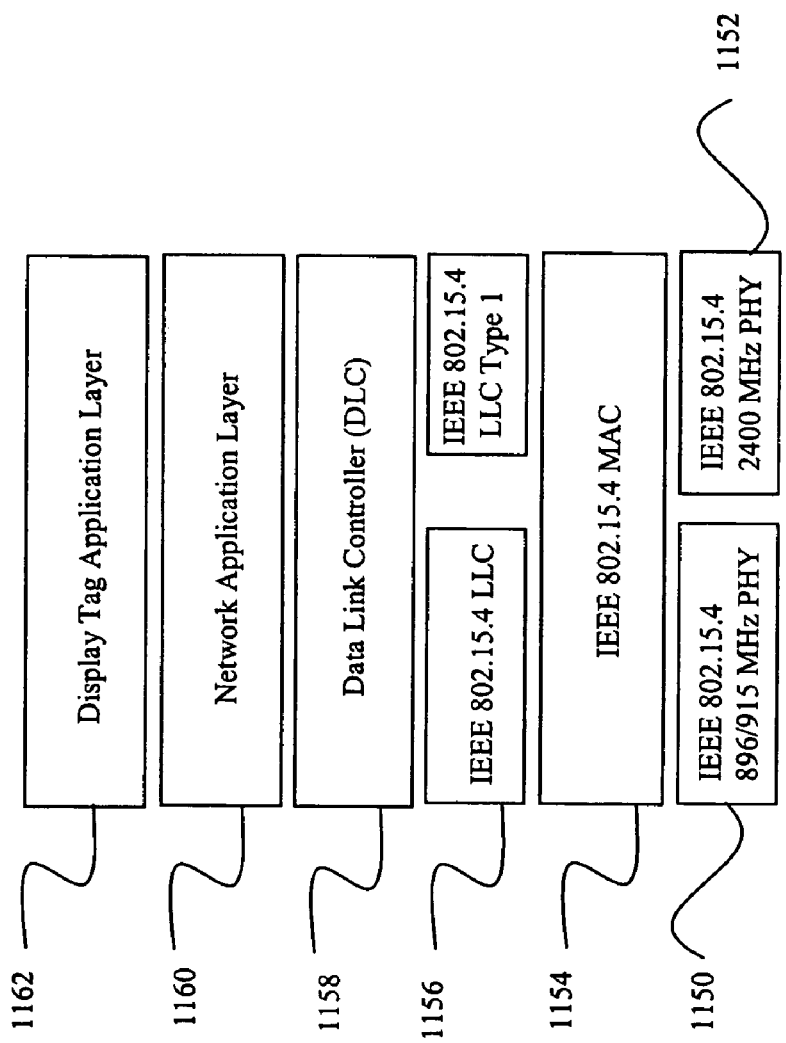

Another embodiment of a protocol architecture that could be used is shown in FIG. 11b. In FIG. 11b, a protocol architecture associated with IEEE 802.15.4 is shown. The lowest layer is one of two possible physical layers defined for one of two radio frequencies. This could be the physical layer based on the 896 or 915 MHz spectrum 1150 or it may be a physical layer based on 2.4 GHz (2400 MHz) 1152. The selection of which frequency to use depends on the regulatory environment of the place of use. Next, the MAC layer 1154 that is defined by IEEE 802.15.4 is used. This layer allows up to 216 addresses using a 16 bit address. A longer 64 bit address format can be used, and that would provide up to 264 nodes. In either case, the number is more than sufficient to accommodate a single cluster or mesh implementation in a retail store. The MAC layer also provides a simple frame structure, encryption, and the possible use of beacons to transmit data at low latency. This latter capability is not typically required for transmitting retail price updates, but other embodiments may use this capability. The next layer is the Data Link Control layer 1156, which provides link management. The next higher layer is the Network Application layer 1160 which typically would be TCP/IP, and finally the Display Tag Protocol (DTP) 1162, which is the application layer protocol.

One embodiment of the DTP is illustrated in FIG. 12. In FIG. 12, the format for the application level message is illustrated. It comprises an Operation Type 1200, followed by a Message Type 1202, and finally followed by one or more parameters 1204a, 1204b. The Operation Type conveys the overall type of transaction that follows. As shown in the table in FIG. 12, there are at least three types of Operation Types: a Request 1206, a Response 1208, and a Unidirectional 1210. The Request operation type indicates that a new transaction is initiated. The transaction typically invokes an operation that requires a response. The Response operation type indicates the result of the operation previously invoked. Finally, a Unidirectional Operation is used when neither of the above is appropriate. For example, providing a status update may occur using a Unidirectional operation type.

The nature of the operation or function being invoked, or responded to, is not indicated by the Operation Type. The Message Type 1202 indicates that information. In many embodiments, there may be a variety of Message Type values, and only three of the more common Message Type values are shown. These are Read 1212, Write 1214, and Acknowledge (ACK) 1216. The Read value obtains or reads data, similar to a "get" function commonly used in computer communications. The Write value stores data, and is similar to a "set" function. The Acknowledgment Message Type 1216 can be used to generically acknowledge a previously request operation. Of course, various other message types corresponding to more specific functions can be defined. For example, there could be a specific version of the 'write' function defined that applies only to writing display data—e.g., "write display."

The parameters are typically associated with various specific resources or information operated upon by the Message Types. Common examples include: Display Line 1, 1218, Display Line 2 1220, Battery Level 1222, and Serial Number 1224. In these examples, the Display Line corresponds to data associated with certain lines in the display. These may be used in conjunction with 'writing' data to a display or storing data in memory. The Battery Level indicates a power level associated with the battery, and the Serial Number indicates a unique manufacturing serial number of the display tag. The use of the parameters may be limited based the definition of the Display Tag Protocol. For example, the serial number can be read from a tag by the DMS, but the DMS may not be allowed to 'write' the value. Similarly, the battery level may be able to be read, but not written.

Several examples illustrate how the components may be combined to convey various types of request and responses. For example:

REQUEST (Read [Display Line 1])

conveys a request for an operation that reads the first line of the display tag. This may be sent by the display management system to confirm the current information that is displayed on the display tag. The Display Tag would respond with:

RESPONSE (ACK[data from display]).

In this example, the RESPONSE indicates that this is a message in response to a previous request. The ACK message type is used to acknowledge the Read message type, and the 'data from display' represents the data currently displayed. Similar examples can be provided for writing values to the display, checking on the operation of the transceiver, reading a MAC address, initiating a self test, etc.

Those skilled in the art of protocol design will readily appreciate that various other message types and parameters may be required or utilized to accomplish the operations necessary for the specific application. For example, including a reference number parameter with each REQUEST and RESPONSE allows multiple REQUEST operations to be outstanding and the response to be correlated with a specific response. However, in simpler implementations, there may only be single outstanding REQUEST that may be issued until a timeout or response is received. Further those skilled in the art of protocols will readily ascertain that only certain parameters can be used with certain message types. As previously illustrated, it may be possible to 'write' data to the display, the not possible to write data to the 'battery level.' The 'battery level' may only be defined as a read-only parameter.

The above embodiment can be augmented to include formatting commands, so that the display data can be formatted to be bold text, large text, or other values. These could be conveyed as parameters along with the text data. Alternatively or in addition, well known formatting protocols, such as HTML or XML could be used, and these have the benefit of being standardized and easily implemented, although this would result in an alternatively layered protocol architecture. Other embodiments may transmit WAV data files to provide audio interaction along with the presentation of graphical information.

Figure 13:
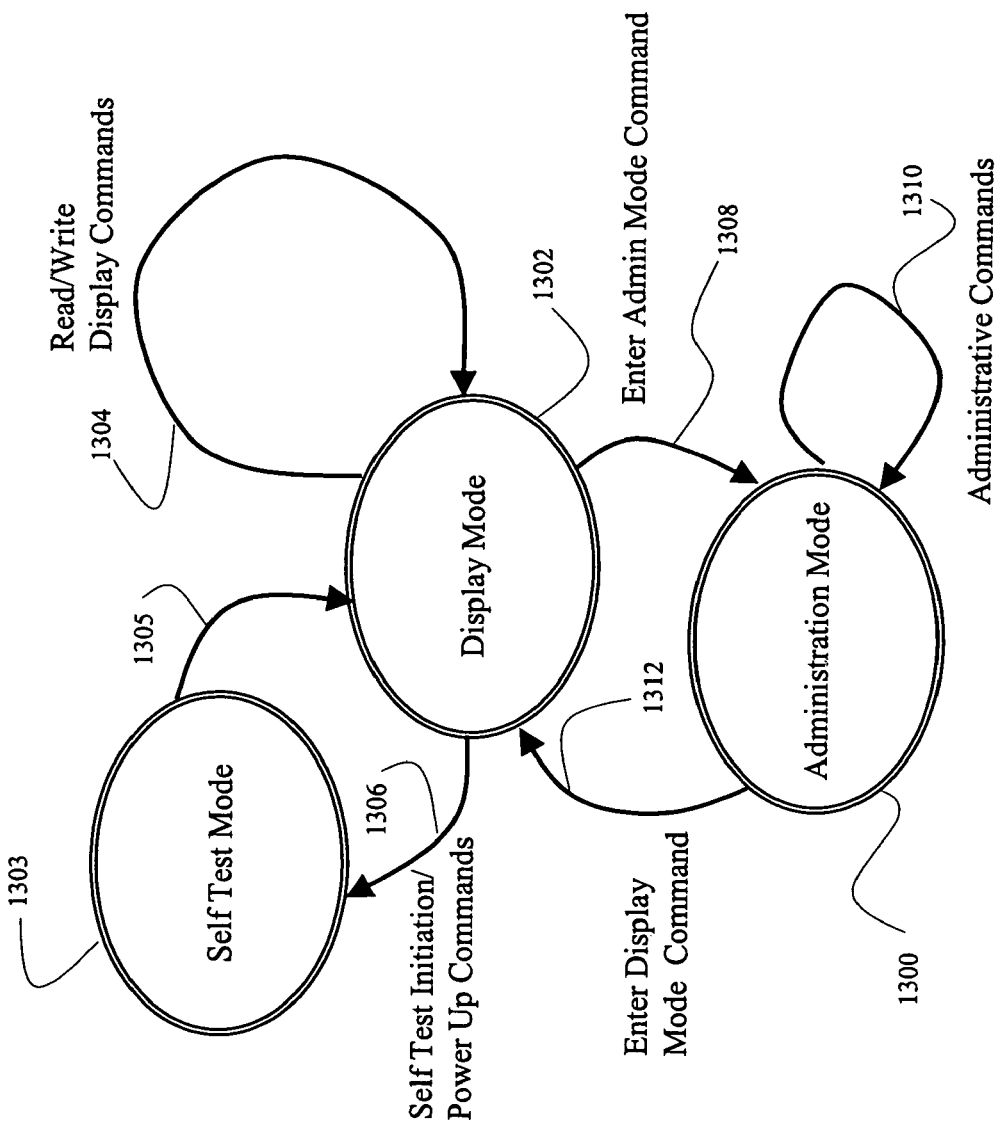
FIG. 13 illustrates one embodiment of a state diagram with various operational modes associated with the display tag.

The operation of the software associated with message processing can be also explained using a state diagram, as shown in FIG. 13. There are three main operating states of the display tag. First, the normal state of operation is the "Display Mode" 1032. In this mode or state, the programmable display tag is displaying information as it normally does. It is prepared to receive and respond to display control messages from the display management system. Further, the display tag may interact with the user as appropriate, such as displaying various screens in response to the user providing inputs via the scroll keys. In this mode, the display tag may receive and process such messages such as the aforementioned Read/Write 1304 messages (as well as others not listed). When such messages are received in the display mode 1302, the system maintains that state. Thus, FIG. 13 depicts receipt of read/write display data message or command 1304 as causing the system to return to the same state. In addition to receiving and processing display messages, the display tag may receive various other type of messages or commands, such as a "self-test" message initiated upon power up 1306 or that may be sent as a separate command from the Display Management System. This message results in the system moving to the Self Test Mode state 1303 and executing the self-test. Upon completion of the self-test, the system automatically returns without requiring any input message 1305 to the normal display mode 1302.

There is a third state that may be entered and that is the Administration State 1300. This state may be entered upon receipt of a command issued by the Display Management System (such as the REQUEST (Enter Admin Mode) message 1308) that places the display tag into the Administration Mode state 1300. In this mode, the display typically does not present the normal display data (e.g., retail price), but typically presents data used for maintenance and/or diagnostic information (see e.g., FIG. 3). Specifically, the normal display information (e.g., price or item description) is no longer displayed and the system may display administration and configuration parameters. Once the Administration Mode is entered, the system acts upon various operation, administration, and maintenance (OAM) messages and may respond different to user input selection. The OAM messages may result specific data presented on the display, but typically the data displayed is the result of the software in the display data determining the data to be displayed, as opposed to the display contents determined by the DMS.

For example, every display tag is identified by a unique MAC level address. Typically, a paper label is placed on the back of each display tag that indicates the MAC level address programmed into the display tag. This allows personnel to readily ascertain the MAC address for administration purposes. However, in the situation the paper label falls off or is not longer legible, it may not be possible to readily determine the MAC address. Verifying the MAC address is typically an important function in order to program the tag properly. Recall that the tag must be placed on a shelf and associated with a product and simultaneous the display tag must be associated with the product by the display management system. This ensures the tag is displaying data for the appropriate item. Thus, it is important that store personnel know what MAC address is in the display tag. If there is no label present, there typically should be are other methods in which the MAC address can be determined. For example, the display tag can display the MAC address on the display in response to pressing one of the input buttons that is reserved for this function. Pressing this button would cause the display tag to go to the administration mode and display the MAC address on the LCD screen. After a fixed time period (e.g., 30 seconds), the display tag could revert to the normal display mode. In essence, an internal Enter Display Mode message 1312 would be internally generated. Alternatively, the display tag could receive a wireless message (e.g., REQUEST (Admin Mode)) and go to the administrative mode or state. Once in this state, the system is prepared to receive a command REQUEST (Display MAC Address) that would result in the MAC address displayed on the LCD. Alternatively, the DMS could send a command message for the tag to display its MAC address for a limited duration. This is particularly useful when used in conjunction with the portable terminal discussed subsequently.

Obviously, the display tag would only operate in the Administration Mode in certain instances. Normally, the display tag is in the display mode state and presenting price information to the consumer. Thus, various mechanisms can be defined to ensure that the Administration Mode is temporary (e.g., such as a timeout timer or entering the display mode upon powering up). Typically, the Display Mode is the default state upon powering or activation of a display tag.

Power Management

The display tag is a portable device that is typically located in a location next to the goods for which it provides information. It is also limited to a range that allows communication with the DMS, and this depends on the power transmission levels, antenna selection, geometry and nature of the physical environment. In some cases, the tag is located where power may not be readily available.

To minimize size and maximize portability, it is desirable that the display tag incorporates a self-contained power source. In some embodiments, external power sources may not be convenient or preferred. Thus, various power configurations are possible. These range from external to internal power sources, as well as various combinations. The preferred embodiment varies based on the use of the display tag and the configuration used to implement the display tag. For the embodiment of providing price information in a grocery store, a self-contained power source may be preferred (e.g., batteries). Such display tags may provide a black and white display (which can operate using less power compared to color displays) to provide price or other text information. Other applications may be designed to provide incentives for shoppers to view the merchandise and a larger display, possible one with color, may be appropriate. Such a larger display may provide animated graphics or images as well as facilitate interactive operation. Further, some applications may provide audio interaction as well through a speaker (this was not shown in the hardware embodiment in the preceding figures). In the former case, a smaller, static black and white display is likely to consume less power than a larger, color based interactive display with sound. Further, pricing information is less likely to change than marketing type information, such as advertisement information (which is more likely to be replaced and updated, thus necessitating downloading more data and more frequently). The latter embodiment consumes more power in the transceiver electronics of the display tag as well in driving the display. Thus, if disposable batteries are used, the required maintenance of checking and replacing batteries may results in this embodiment as undesirable and suggest the use of an alternative power source.

In the first embodiment discussed, an external power source is provided. The power provided is typically a low voltage, such as 5 VDC or 12 VDC, which is easily regulated to the voltage required by the display tag circuitry (e.g., 3 to 3.5 VDC, or 1.5 VDC). The IEEE 802.15.4 based systems are designed to work with low power. Power can be provided by providing two continuous power strips as shown in FIG. 7 affixed to a shelf. One strip 702*a* provides a positive 5 VDC (or thereabouts, which may be slightly higher to account for voltage drops) while the other power strip 702*b* provides ground. In one embodiment, the power strips are mechanically affixed to the front edge of store shelving, while in other embodiments they are built into the shelving. This embodiment facilitates small sizes display tags, as there is no requirement for batteries and related circuitry. Further, there is no need for solar cell or other technology to prolong battery life, such hardware or software to put the device into a sleep modes, limiting transceiver operation to a fixed time schedule, etc.

Another embodiment combines the external power source with self contained, internal power sources. This typically involves the use of batteries in the display tag, which would be either the rechargeable or non-rechargeable form. The rechargeable from would obtain power to recharge the batteries from the power strip and would facilitate providing power to operate the display tag when the power strip is temporary non-functional. The display tag could also use non-rechargeable batteries and select between using the external power source or the battery as the power source based on the availability of the external power source. For example, the display tag would select the external power source if available, otherwise it would operate using the non-rechargeable batteries. When the external power source became available, then it would return to using the external power source. In this manner, minimizing its use could prolong the non-rechargeable battery life.

The use of batteries and/or the requirement of a portable device with a long battery life suggest the use of a wireless protocol designed for low power applications. The IEEE 802.15.4 wireless protocol is designed to facilitate operation of battery powered devices. This wireless, communication protocol minimizes power drain so that the batteries have a long life, but yet the 802.15.4 protocol provides a bandwidth which is more than enough to provide pricing or consumer information updates. Those skilled in the art in 802.15.4 applications and system design will recognize the various attributes of this wireless protocol that make it particularly well suited for low power, disposable battery embodiments.

Wireless Transciever

Figure 14:
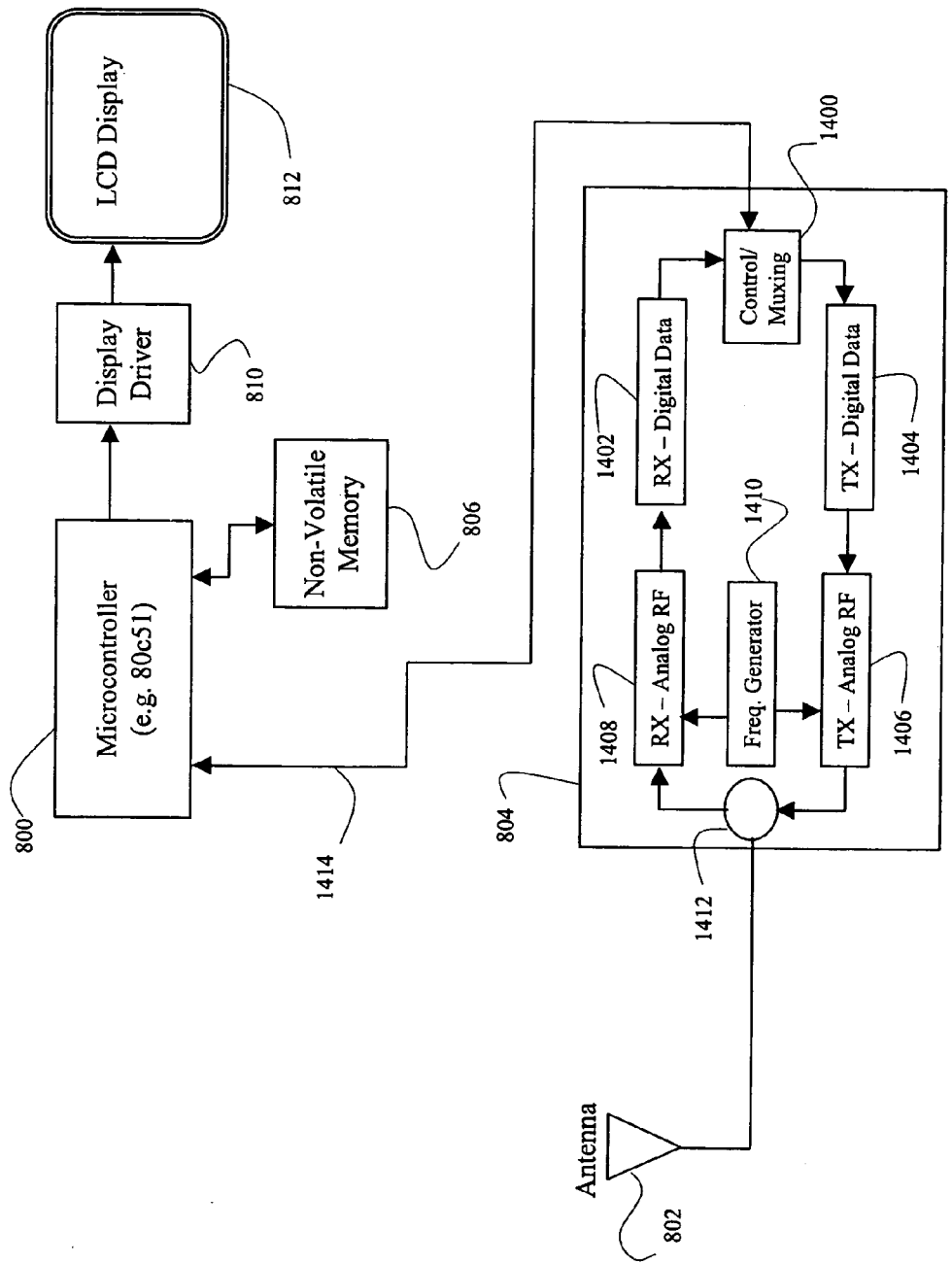
FIG. 14 illustrates one embodiment of the wireless interface transceiver used to communicate with the display tag.

The wireless transceiver is the radio electronics that transmits and receives the data using radio waves. Some, but not all, of the functions of the wireless transceiver are shown in FIG. 14. FIG. 14 is based in part on FIG. 8, but elaborates on the wireless interface 804. The wireless interface 804 communicates with the micro controller 800 using a data bus 1414 which typically is a parallel data bus of 8 or 16 bits. The data is received by a muxing and control unit 1400 that sends and receives data to the processor. The data received by the wireless interface is processed by the transmitter digital data circuitry 1404 which in turn transfers the data to the radio transmitter electronics 1406. The data is sent to a splitter/combiner 1412 and the to the antenna 802. In a similar manner, radio signals received by the antenna 802 are segregated by the splitter/combiner 1412 and sent to the radio receiver 1408 that produces the received signals to that digital data circuitry 1402 that provides it to the multiplexer. The frequency generator 1410 provides the necessary timing signals necessary to synchronize component operation. Of course, other functions are present which are not disclosed, but this is typically provided by a single integrated circuit component, or a small set of chip components, so that it is not necessary to know all the details of the wireless interface operation in order to practice the principles of the present invention. Those skilled the art of wireless circuitry design will readily know how to interface a wireless transceiver to a micro-controller. The wireless interface could be constructed of separate and discrete components, and its design will depend on whether a TDMA, CDMA, or some other based radio interface is used. Any of these can be used in practicing the skills of the present invention. In one embodiment disclosed, an IEEE 802.11b or an IEEE 802.15.4 based wireless communication protocol and radio interface can be used, although other wireless communications standards can be used.

Display Management System

Figure 15:
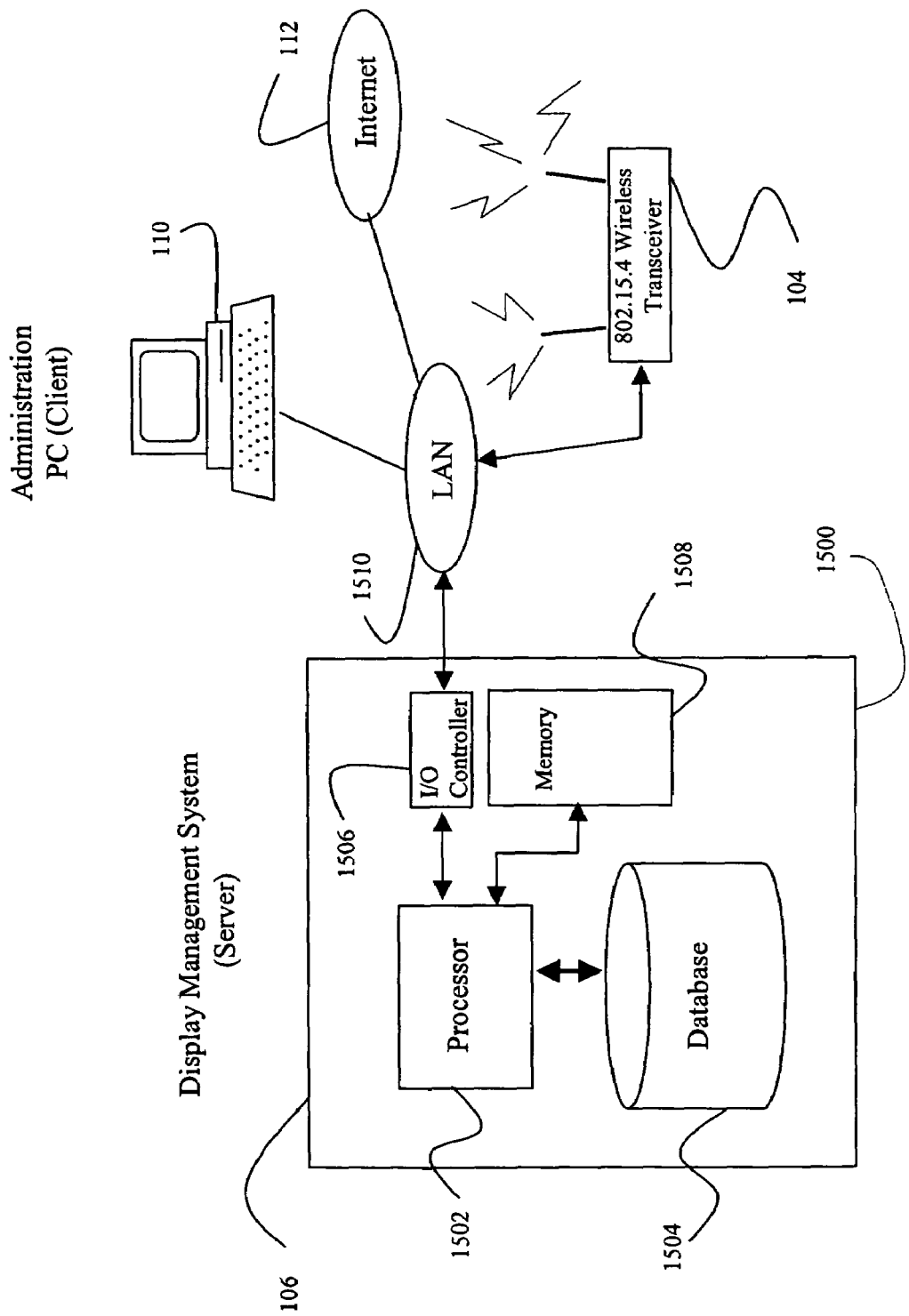
FIG. 15 illustrates one embodiment of the Display Management System used to administer the display tags.

The display management system (DMS) 106 (also referenced as 1500 in the FIG. 15) is illustrated in FIG. 15. The DMS manages a plurality of displays, typically all the displays located in a single retail store. Alternative configurations are possible in which displays tags in various retails stores can be controlled as well, such as involving a remotely connected access point or transceiver. However, the embodiment in which the DMS controls a plurality of displays in a single store is sufficient to illustrate the various principles of the present invention.

The DMS typically comprises a computer server 1500, which can be a PC, dedicated server, minicomputer, or other similar computer system. The server 1500 comprises a processor 1502 executing the display management application program and accesses display records stored in the database 1504. The database could be remotely located, but in the present embodiment, the database is shown as part of the server 1500. The processor also accesses a memory 1508. The memory can temporary store display records that are retrieved from the database.

In various embodiments, the DMS may be integrated into an inventory management system such that the database stores inventory information in association with display tag and display information.

The DMS also includes an input/output management component 1506 that is used to convey data to/from the wireless transceiver 1514 and to/from an administration computer 1512. The administration computer is typically acting as a client to the server 1500. As is well known to those skilled in the art, a LAN 1510 facilitates the server communicating with the administration computer or the transceiver. The LAN is typically an Ethernet, token ring/bus, or similar technology as is well known to those skilled in the art. Alternatively, other interfaces, such as those based on ISDN, frame relay, dial-up modems, X.25 or other protocols may be used. In addition, multiple administration PCs may access the server, as well as printers (not shown) and other devices.

The server or DMS typically receives commands from the administration PC and provides data for display to the operator on the administration PC's monitor. The user or operator can query display records, update the data individually, and read/write data to a particular display tag. The server may also execute applications autonomously without requiring interaction by the administrator via the administration PC. The application in the DMS may receive and process an update price data in an update file transmitted from an external source and automatically updates the appropriate display tags and potentially inventory records stored as well in the database. The update files may be received at the server from the Internet 1516 from a remote computer system (not shown) that transmits the update price files. Typically, the remote computer system may be associated with a regional headquarters organization that provides price updates to several stores in a region. This information is typically handled by an inventory or POS system, which in some embodiments may be integrated with the DMS functions.

The DMS communicates with the various display tags by sending/receiving command messages (such as previously discussed) using the 802.15.4 wireless transceiver 1514. The DMS can communicate with the display tags without being aware of the particular wireless communication link used, and in alternative embodiments, the wireless transceiver may be integrated with the server rather than accessing the transceiver via the LAN. In other embodiments, the DMS and wireless transceiver may be remote to each other and communicate over the Internet, LAN, WAN, or other communication means.

The DMS maintains a database containing records associated with each tag. The database records may be accessed using different indices. For example, one method may index records by identifying a particular product from inventory e.g., using an product identification number such as a stock keeping unit (SKU) number. This is useful if personnel need to retrieve information associated with a particular product, such as verify a particular tag associated with the product. In other instances, the display tag identifier may index the data pertaining to a display tag. This is useful if personnel need to retrieve information pertaining to a particular display tag, e.g., battery level indication.

Figure 16A:
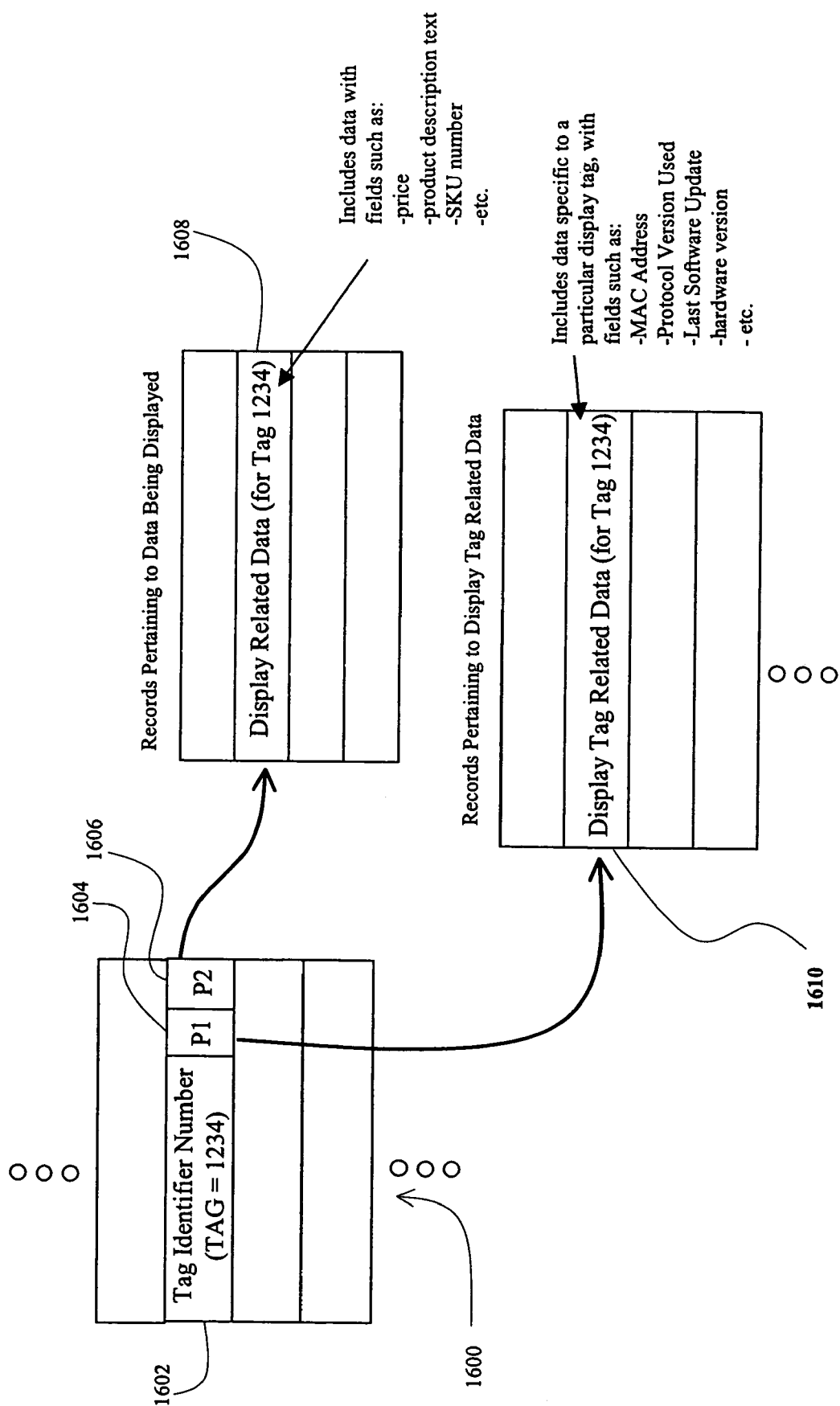
FIG. 16a illustrates one embodiment of a data structure associated with the display data maintained in the display management system.

One embodiment of the database record structure and data is illustrated in FIGS. 16*a*-16*c*. In FIG. 16*a*, an index 1600 comprises a series of values wherein each value serves as an index to specific display tag records. The index can be the product identifier (such as SKU or similar number) as previously mentioned, or as illustrated in FIG. 16*a*, the index 1602 could be based on the display tag identifier number (e.g., MAC address, shown with an abbreviated address of TAG=1234). Typically, the DMS database manager allows multiple indices to be used. Thus, although the index illustrated is made up of Tag Identifier Numbers, other indices may be present, such as that based on an inventory or product identifier. The indices 1600 typically comprise a plurality of values arranged in ascending or descending order. In the embodiment of FIG. 16, the index is the Tag Identifier Number 1602 which can be based on a: logical value or any other unique number associated with the display tag, such as a MAC level address. Typically, the tag identifier is a numerical value (although there is no reason why alphanumerical values could not be used) that typically corresponds to information printed on a label attached to the programmable display tag, or indicated in some other form of human readable means (e.g., engraved or molded into the case of the tag).

In FIG. 16*a*, the index, indicated as a Tag Identifier number 1602 is associated with two pointers, P1 1604 and P2 1606. Although pointers are used to illustrate the association with other values, other forms of linking, association, or storage structures could be used. The first pointer, P1 1604 indicates a specific record in another file comprising Display Related Data records 1608. These records contain data, typically in separate fields, that contain data associated with that being displayed by the display tag. Note that "display data" is that which is displayed, or associated with what is displayed by the display tag. The other pointer, P2 1606 points to a specific record in a file comprising Display Tag Related Data records. The Related Data of a Display Tag is that data pertaining to the display tag other than what is displayed. It typically would include fields indicating MAC address, protocol versions, etc.

The distinctions between the Display Related Data records 1608 and the Display Tag Related Data 1610 records are illustrated in FIGS. 16b and 16c. FIG. 16b illustrates one embodiment of the various types of fields that may be contained in the Display Related Data record. Of course, more or less fields may be present, and the fields used will vary based on the application. For example, other display tag applications may include graphical images and/or formatting commands that would be indicated by a particular field. In the application used to illustrate the principles of the present invention (e.g., indicating the price for items in a grocery store), graphical icons may not be required, whereas other applications may utilize graphical icons or images. In other cases, the Display Data may be pointer to another file, containing a JPEG, XML or other type of file.

The data indicated for presentation on the display can be defined several ways. For example, the database could simply store data for "Line 1" of the display. In this type of embodiment, the DMS can transmit the first line of data to be displayed at the display tag. The display tag, upon receiving the data, simply copies the data associated with the first line onto the display. Alternatively, the fields could be defined so that the display tag is aware of the meaning and structure associated with each data field. The latter is illustrated in FIG. 16b as there are different fields explicitly defined. For example, one field is the "Regular Price" 1611 field that is defined as a 'price' data type. The data type defines the nature of the data. In this case, a "price" data type is defined as representing dollars, and includes a "$" preceding the dollar number, followed by a decimal, and followed by two additional digits. In the example illustrated, a typical value could be $1.38. Another field would indicate a description 1612 of the item referred to, and this would contain a text data type. In the example illustrated, one value could be "House Brand Pudding." Various other fields can be stored for display on the display tag, including size data 1613, brand data 1614, nutritional data 1615, advertising text 1616, sale price 1617, sale price starting time/date 1618, and sale price ending time/date 1619. These fields may be of various data types, and these may be defined for a particular application. The embodiments illustrated in FIG. 16b include text, alphanumeric, time/date, and price. Other types maybe defined as appropriate for the application. Further, audio or other media types may be indicated or combined for presentation by the display tag.

The values in the Display Related Data record are data typically associated with the product and how that data should be displayed in some manner on the display tag. In some embodiments, a standard such as HTML or XML can be used to define the data and its presentation. How the data is displayed may vary. For example, the price data may be displayed in large font size, and other ancillary information may be in smaller font. Further, some information may be formatted on second logical screen. For example, nutritional information may be logically formatted on a second screen that is displayed when the user interacts with the display tag (e.g., pressing a scroll key). This allows the display tag to have the display data in memory locally without having to retrieve the data from the DMS system.

This embodiment applying the principles of the present invent focuses on data stored in the DMS that is presented or mirrored by the display tag. In other embodiments, the data "direction" is opposite. In this case, the programmable display tag could be, for example, a temperature sensor that reports data to the DMS (rather than primarily receiving data). In this case, the Data Display records stored in the DMS would correspond to measurements obtained by the display tag and reported to the DMS, all the while the display tag also displays the current temperature on the display.

For each display tag identifier in the database (e.g., see FIG. 16), the DMS also maintains Display Tag Related Data. The Display Tag Related Data pertains to data associated with the unit itself, excluding data that is displayed. For example, the display tag record may replicate the tag number identifier 1630 (or for purpose of illustration, may be logically considered as being replicated). The record may also store data pertaining a model or version number of the display tag 1631. In this embodiment, the value is a numerical value and may be used to distinguish different capabilities associated with the tag for backwards communication capabilities. This value may also identify the software version loaded into the display tag, or alternatively, another field may be defined for this. The Display Tag Related Data record may include a start date when the display tag was initially put into service. The record may also indicated when the batteries were installed 1633. (Of course, this field is not required if the unit does not require batteries.) Alternatively, the battery level 1634 may be useful to determine when the batteries require replacement, but again this field is not required if the unit does not require batteries. The battery level field would be populated by data transmitted from the display tag to the display management system. The tag may autonomously report this data, or the DMS may periodically query the tag for the data and stored the data in the appropriate record. Additionally, the system may record information associated with periodically executed self-tests 1635.

In short, any information about the display tag itself can be stored in the record, which is associated in some manner with the display data of the display tag. Of course, a display tag may not have any data currently displayed and in this case the fields of the display data records would be empty, but each display tag typically does have some information populated in the Display Tag Related Data record.

The administration terminal connected to the DMS allows the administrator to easily inspect and manage the aforementioned records. This is accomplished using common database commands. Several of the more pertinent functions are discussed, though those skilled in the art of database operation will recognize that many other operations may be performed.

One common function is the addition or deletion of a display tag to the system. The addition of a display tag involves the administrator selecting this function (e.g., "Add New Display Tag") from a menu option at which the administrator is prompted first for the display tag number. This operation has the effect of adding a new value into the index file and establishing new pointers to new records in the Data Display file and the Display Tag Related Data file. The operator provides the necessary information, and the system (typically checking so that it is not duplicated) populated the new Display Tag Related Data record. The administrator may provide other data, or the system may default to certain values, as appropriate. Once created, the administrator may then populate the Display Related Data fields, as appropriate, indicating, for example, the price, item description, and so forth. Typically, these values are set as the default values, and any further changes, namely a change in price, is usually accomplished automatically.

Other common functions provided to the administrator include locating a particular tag (e.g., based on text description, tag number, or item identified) and inspecting the data associated with the display tag (either the tag itself or the display data). The system provides functions for editing certain fields, and storing updates.

Further tools may be provided allowing the user to create the contents of each of the records, and define what fields are stored with each display tag. The use of the administration PC on a manual basis allows correction of errors, or manual override of information. Typically, records indicating new prices are received in files by the DMS from another location, and the DMS processes each file ensuring that the records in the database are updated to reflect the contents as defined by the file. The actual display data may be received by the DMS as determined from a remote system, or the DMS may create the actual display data based on the file received. This allows, for example, a regional office to transmit price and inventory updates automatically without manual entry of all the changes at each location. However, in many instances, each store location will require to perform these functions locally and independently, e.g., such as when a item is not longer carried by that location or the item is only carried by that location.

Portable Wireless Terminal

Figure 17:
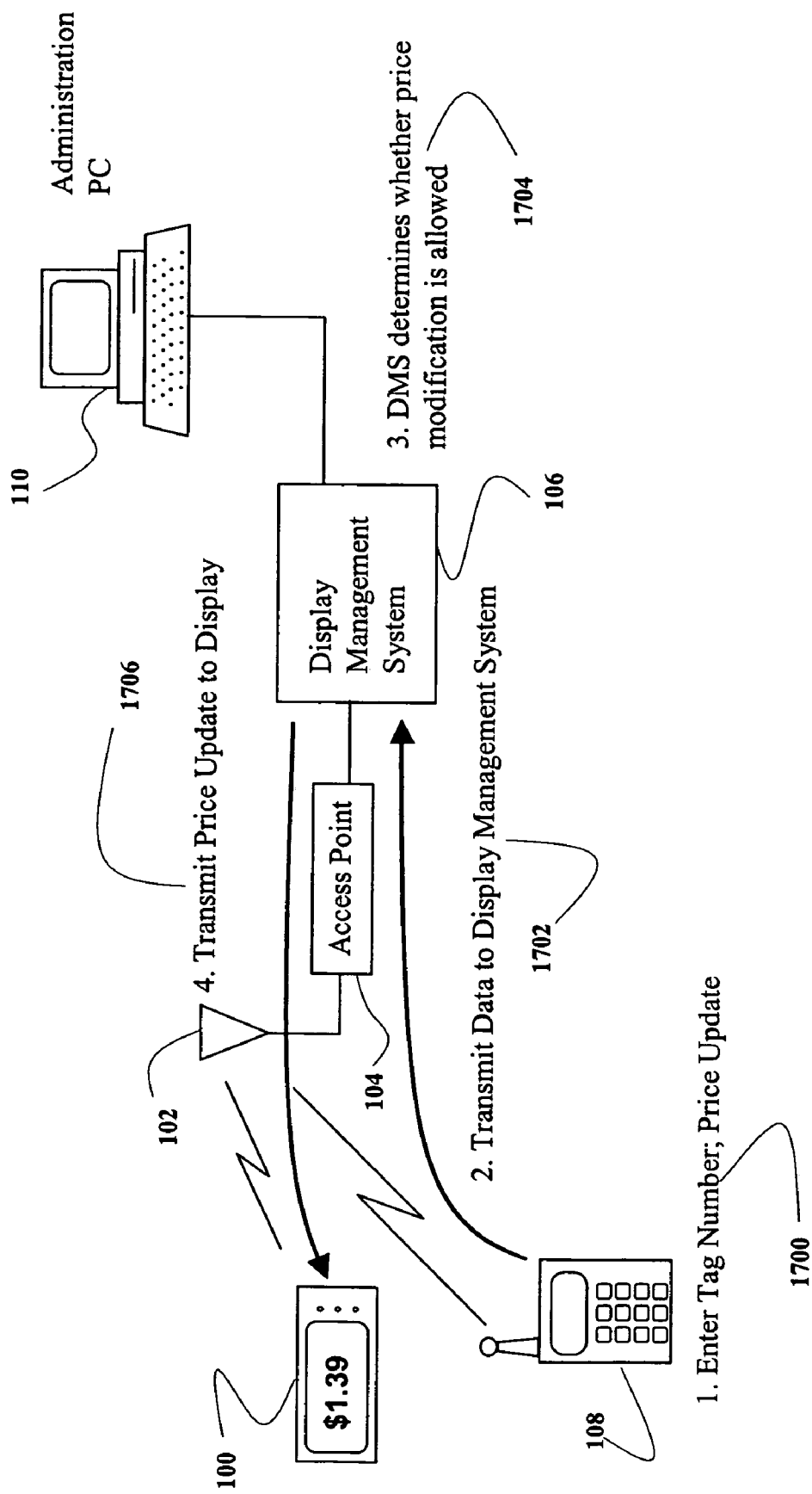
FIG. 17 illustrates one embodiment of a remote terminal providing price update information to the display management system.

FIG. 17 illustrates one embodiment of the Display Management System as it is used in conjunction with a portable wireless terminal. In this embodiment, a typical application is illustrated wherein store personnel must correct or verify the information displayed on a particular display tag. Such circumstances may arise if an incorrect price is displayed, an item description is misspelled, or other information is displayed must be modified for whatever reason.

In FIG. 17, the store personnel (not shown) are typically located physically near the particular display tag 100 associated with a particular item on display. The store personnel may desire to update or alter the price or description information. This is typically done using a portable wireless, handheld terminal ("wireless terminal", "portable terminal", or "remote terminal") 108. This is similar in design in some aspects to the portable bar code readers used in retail environments. Both such wireless terminals are handheld, have a display, provide keypad entry, and communicate wirelessly with another system. However, the portable terminal in this instance is not used to detect inventory items using a bar code reader and communication a POS application. The wireless remote terminal in the present system preferably uses the same wireless communications protocol to communicate with the DMS as is used by the DMS to communicate with the display tags. Although this is not required to practice the invention, this embodiment allows the DMS to use the same wireless transceiver to communicate with the remote wireless terminal as the DMS uses for communicating with the wireless tags.

The wireless terminal 108 could, in some embodiments, communicate directly with the display tag. In the embodiment shown in FIG. 17, the wireless terminal communicates to the antenna 102 associated with the access point (transceiver) 104 used by the DMS 106. The user begins the procedure by identifying the particular tag number 1700 by inputting the appropriate information using the keypad input on the remote terminal. This data is required since the DMS has to know which tag the user is desiring to inspect or edit the display value. The user may cause the wireless terminal to send a command 1702 to the DMS 106 indicating updated price or other information along with the display tag identifier. The DMS 106 may then retrieve a record from memory or from the database associated with the price tag. The DMS may optionally verify the current information in a response message to the wireless terminal. In addition, the DMS may verify that the wireless terminal is authentic and authorized to provide price updates 1704. Standard authentication mechanism using encryption and well known authentication techniques may be used. Such a mechanism prevents an unauthorized remote terminal from alternating the price displayed on a display tag. Assuming the update is allowed, the DMS updates the record in memory associated with the display tag and initiates a message 1706 via the wireless transceiver to the display tag 100 for updating the display.

In this embodiment, the wireless terminal may provide to the user a subset of functions that are available to the user at the administration PC 110. Thus, price modifications, updates, verification of display tag information can occur via the administration PC as well as the wireless terminal 108. However, typically a superset of capabilities is afforded to the administration PC. For example, the administration PC is typically used to authorize access by a wireless terminal to the DMS as well as establish verification (authentication) and other security data required for effecting communication between the wireless terminal and the DMS. This typically involves the user entering certain identification data to the DMS using the administration PC where the identification data is unique to the wireless terminal. Password and other security information may be then correlated with the identification data. It is desirable that, in some embodiments, security information such as public/private keys be used to encrypt or authorize a wireless terminal to access to the DMS. Because the administration PC is typically connected to the DMS, the physical presence of a user that is required is an added layer of security.

In some embodiments, the remote wireless terminal may incorporate a bar code reader. This may be used to read bar codes on products, but may also be able to read bar codes that are presented on the programmable display. This could be used to allow the portable terminal to remotely interact with POS, inventory, and other systems. For display tags incorporating displays capable of fine resolution, which typically is the case for bit-mapped LCD displays, the display tags can be programmed to display a bar code. The meaning of the bar code may vary depending on the context. For example, it is possible that the programmable price tag may display a bar code in conjunction with the price or description of the item associated with the display. The bar code in that case could represent the SKU of the product. In other contexts, such as when the programmable display is in the administration mode, the display tag may display a bar code that represents the MAC address/or some other tag identifier value. This would allow the remote terminal to 'read' the bar code on the display to identify which display tag it is or what product the display tag is associated with. The determination of which bar code is displayed by the LCD display may be determined in part by providing input via one of aforementioned input switches on the display tag.

When the display tag displays a bar code corresponding to its address (e.g., such as a MAC address), the portable or remote terminal can 'read' the address of the bar code associated with the tag's address and then 'read' a bar code associated with an inventory item. The DMS, based on the context indicated by the signaling messages, could 'associate' the display tag with the inventory item. This procedure facilitates establishing the association in the DMS between a particular tag and an inventory item. Once the association is established, then the DMS is able to program the correct display information to that display tag.

To illustrate with an example, a particular inventory item, say milk, is to be associated with a programmable display tag. One approach is to use the administration terminal or PC to manually create the association between the inventory item and the particular display tag. This can be done by entering in the inventory identifier and then the MAC address and indicating that an association is to be established. A preferred approach that avoids error in data entry is to have the store personnel use the portable terminal to indicated that an association is to be performed (perhaps by hitting a function key on the remote terminal), scanning the inventor item bar code (e.g., the container of milk) and then the address bar code displayed by the display tag (alternatively, the bar code could be printed on a label affixed to the display tag). With the indication of the inventory identifier and the display tag identifier, the DMS can then complete the association. The DMS would then program the display tag accordingly, and store personnel can then observer the display (which would indicate "Milk") and would confirm that the association is complete.

EXAMPLE

Updating Tag Prices

A typical application of the principles of the present invention involves remote updating of the prices on the display tag. In one embodiment, a remote system provides a price update file identifying individual inventory items by an inventory code, such as a SKU number, along with the current price information. The Display Management System processes this information and determines what display data is to be transmitted to the display tags along with any other changes to the display information. Continuing with the embodiment of a grocery store utilizing display tags for indicating the price, the updated data file would be sent by a regional system to each store. The regional system coordinates prices for items stocked by all stores in a defined region. A typical application is a central system coordinating the sale prices for goods in a given market.

Figure 18:
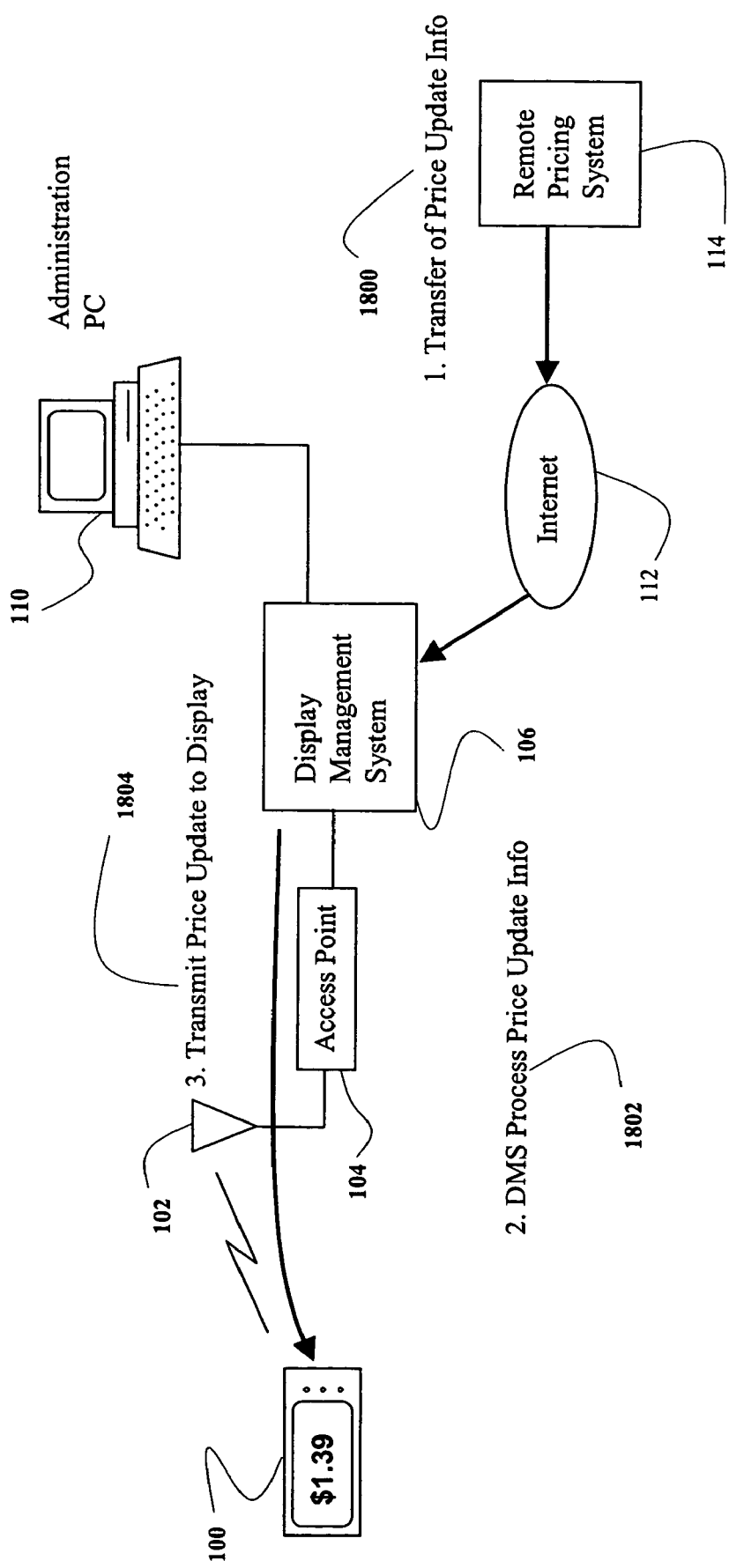
FIG. 18 illustrates one embodiment of a remote system providing price updates to a display management system for updating prices on a display tag.

FIG. 18 illustrates one embodiment of this application. In FIG. 18, a Remote Pricing System 114 determines which items are to be put on sale and their corresponding price modifications. This information is transferred as a file in Step 1 1800. The file may be transferred by using the Internet 112 in conjunction with commonly used Internet protocols for transferring data, or other private communication facilities, such as virtual private networks. Various types of protocols can be used, such as those specified by the OSI standard or EDI mechanisms. The Remote Pricing System 114 may update a number of stores, but in this embodiment, only a single destination is illustrated. That destination is uniquely identified by a network address so that information is communicated to the Display Management System 106. The DMS typically receives the update file autonomously, and no specific intervention from the Administration PC or administrator is required to process the data. However, in some systems the DMS may receive the data but require explicit approval by a store manager before updating or posting any price changes or updates. The data received by the DMS may directly populate the display data fields in the DMS, or the DMS may process the received data and derive the display data.

The DMS system may also be integrated into or combined as a subset of an inventory management system, although that is not required. Once receiving the update file, the DMS may process the file in Step 2 1802 by examining each item, determining the inventory identification number, which is typically the UPC code associated with the item, and then updating a database comprising a pricing file. The DMS may update a local pricing file indicating the price of the item, such as the regular price, the sale price, and the sale duration. The update file may contain the start and stop days of the sale, or the update file may simply contain a permanent price change.

The DMS 106 then communicates the price change data to each display tag in Step 3 1804 by using the Access Point transmitter 104 connected to the antenna 102. The wireless technology could be the aforementioned 802.11b, 802.11g, or 802.15.4 wireless communications standards, as well as others (e.g., "Bluetooth", cellular data, such as GPRS, CDMA 1Xev-DO, etc.). The end result is that the data for the new prices are reflected on the appropriate display tag 100 at the appropriate time.

EXAMPLE

Assembly Line

The application of a programmable display tag may also be embodied in other applications. For example, a portable display unit may be affixed to an item on an assembly line. This would allow information associated with the item manufacturer to be displayed to facilitate assembly or other actions by workers. For example, a programmable display could be affixed to an automobile during assembly and programmed by a central computer at the start of assembly with information associated with the vehicle. The display tag could indicate a particular model type, color, options, or other information that would be useful for assembly workers. The workers examining the tag would easily determine this. At the completion of assembly, the portable display unit is removed and reused on another unit being manufactured.

EXAMPLE

Material Handling in a Warehouse

Other applications of the programmable display tag would be as a programmable address label affixed to crates or other large items in a warehouse. The display tags provide data associated with the crate, such as the addressee, contents, shipper, weight, or other information useful to persons handling the item. Further, the programmable display tag could incorporate sensors recording the location of the package at various times, environmental conditions at various points in time, such as its temperature, humidity and whether any shocks or mishandling occurred. This information could be recorded into memory on the display tag and queried at certain points in time. For example, at delivery or storage of the crate, the data could be read and delivery data can be confirmed.

EXAMPLE

Advertising

The programmable display tag is not limited to providing specific text or other data, but can provide more general information, including graphics, animation, video, or any combination. Further, the display tag can also provide sound in conjunction with display information, assuming the display device is equipped with audio speakers. For example, a large color display, as embodied in a large LCD digital display monitor, could be interfaced with the 802.15.4 communication logic and a micro-controller to allow advertising information to be displayed. Such a monitor would typically require an external power source, which could also power the 802.15.4 circuitry. This would allow placement of the monitor in the vicinity of particular goods or at a particular location while allowing remote programming of advertising data for display to passers-by. For example, in department store, the display could be programmed to provide color images of certain clothing styles and displayed with the clothes to capture the attention of potential shoppers. In other embodiment, the screen could be coupled with a touch screen allowing user-interaction in selecting the information to be presented. By allowing wireless programming of the data to be displayed, the display unit can be easily located and operated wherever a power outlet is located. This allows flexibility in placing the advertising display without being constrained where existing data communication wiring is located.

EXAMPLE

Meeting Room Information

In another application of the principles of the present invention, a LCD display (such as the size of a 17" rectangular LCD display) can be mounted on the wall in a conference center near the main entrance to a conference room. The display can be remotely programmed to display the scheduled meeting detailed, such as the name of the group, particular session, and times. This allows easy and convenient placement of a programmable display without requiring installation of communication wiring to transmit the data.

EXAMPLE

Remote Sensor Displays

In another application of the principles of the present invention, a LCD display (such as the size of a 6" rectangular display) can be mounted at a location to display data regarding sensed conditions. A central monitoring station collects the data from sensors, and reports the conditions as appropriate to the programmable display tag. This could be used to monitor a particular temperature, the presence of a suspected chemical, or other condition and report the data to a convenient location. For example, a remote location (e.g., basement of a building) may monitored for a particular condition—e.g., abnormal rise in temperature. A sensor could be placed in the basement that is integrated with a 802.15.4 transmitter that transmits the data to a programmable display. The display is then placed in a convenient location (e.g., office) where it can be easily observed. Thus, remote conditions can be easily detected by viewing the data on the display tag. The display tag could even allow review of past data by providing the appropriate capabilities and human-machine interface. There are a variety of devices sensing conditions (e.g., temperature, voltage, oxygen, light, or other types of conditions) that currently incorporate an integrated display. The programmable display tag would allow the display to be remotely located as well as allow a plurality of displays to presentation the data.

Thus, many voltmeters, temperature meters, pressure sensors, weight scales, may incorporate a wireless communications link to a display, where the meter acts as a DMS interacting with a sensor and reporting the sensed data to one or more displays. Further, the display may incorporate input buttons that result in the display sending a message to the meter, indicating one of several selected conditions to be sensed. Thus, a barometric, temperature, and humidity sensor could be integrated with a 802.15.4 wireless interface, and it selectively reports data for different conditions to a display in response to the user selecting a input for each type of data.

The embodiment of a display tag incorporating a sensor can also be illustrated using the aforementioned grocery store application. The sensor display tags may be placed in various refrigeration and freezer units. The tags may display the temperature so that it is readily visible to store personnel. Further, the sensors may periodically transmit temperature readings to the DMS, which records the time and temperature and associates the value with a particular sensor in a database. The DMS may further retain a graphical map indicating which sensors are placed in which locations. Upon request, the DMS can then present a graphical map indicating the location of the sensors and their associated temperature readings. The DMS may also define thresholds at which the DMS sends a notification message to a defined destination. The message would typically indicate the sensor, the temperature reading, and the location. The message could be a telephone call to a predetermined number using speech synthesis or could be an electronic message (e.g., email message) to defined address, or any other communications medium and address as defined by the user and indicated in the DMS. Upon notification, appropriate service repair personnel can be dispatched to repair or investigate the cause of the problem. Similarly, detection of loss of power (which could subsequently cause a loss of refrigeration and increase in temperature) could be detected and reported in a similar manner.

EXAMPLE

Automobile Display Tags

Another application of the principles of the present invention is to utilize the programmable display tag for displaying sales information for automobiles. Typically, new automobiles are provided with a manufacturer's description of the automobile printed on paper this pasted on the window. Used cars, typically do not have any printed documents as such, and may at most have markings on the windshield as to price. For used automobiles, sales persons may consult notes written on paper containing the latest prices. Since the prices frequently change for at least some of the cars on frequent basis, the sales persons may not have the most current information. Further, the updated price lists may not have any further information about the automobile.

In this embodiment, a LCD display, typically 4 by 6 inches or larger, is used to display the sales price, as well as other pertinent information about the car's features. In this embodiment, the display would be designed to be weatherproof, so as to withstand exposure to the elements, if necessary. Typically, the automobile may be located more than 30-70 meters from the DMS, and this embodiment could utilize the mesh architectures (e.g., as discussed in conjunction with FIG. 9) allowing a remote programmable display tag to be controlled by the DMS even though the tag is more than 30-70 meters from the DMS.

This embodiment equally applies to other sales or storage applications where heavy equipment or goods are stored or viewed in an outdoor environment.

EXAMPLE

Display Tag with Integrated RFID

Another application of the principles of the present invention is to integrate the programmable display tag with an RFID tag. RFID tags are well known in the art and can be classified as active or passive. Either form could be integrated with the programmable display tag. One ready benefit is that the value programmed into the RFID tag can be displayed, allowing personnel to reading the value of an RFID tag without a separate RFID reader.

Figure 19:
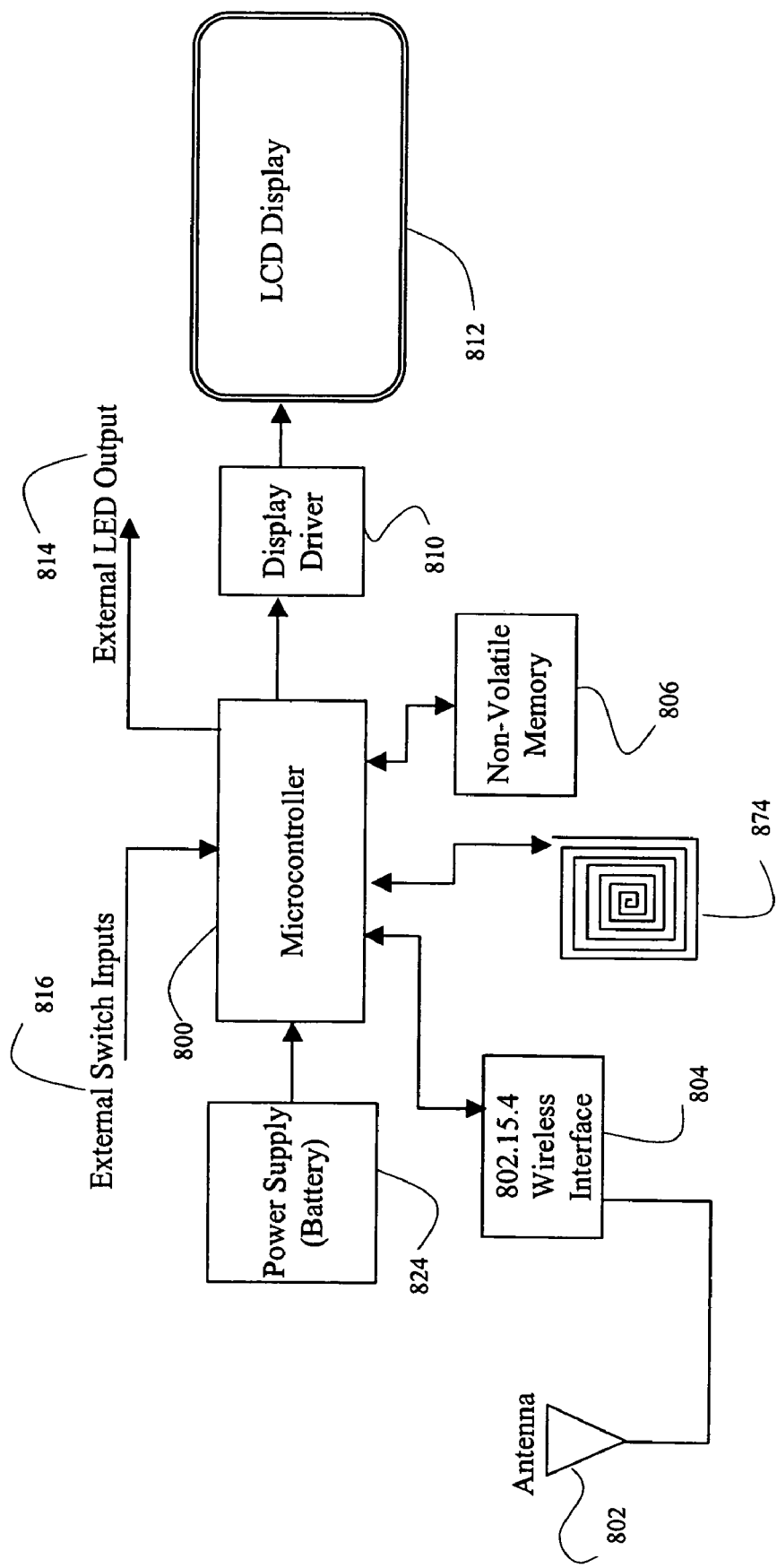
FIG. 19 illustrates one embodiment of a programmable display tag integrated with a functionality of an RFID tag.

FIG. 19 illustrates one embodiment of integration of a passive RFID data with the programmable display tag. In this embodiment, the power supply 824 comprises a battery, allowing the display tag to be portable. The power supply provides power to a micro-controller 800 that contains the logic for the particular applications The micro-controller can transmit and receive data via the 802.15.4 wireless interface 804 using an antenna 802. A second antenna 874 is interfaced with the micro-controller, but in a manner slightly different than the 802.15.4 antenna. The second antenna is of the type used with RFID tags.

Recall that passive RFID tags operate by having a resonator antenna functioning with an integrated circuit (IC) wherein the integrated circuit stores the particular number. In this embodiment, the integrated circuit storing the number is implemented using the micro-controller. Alternatively, a separate IC may be used, or the signals may have to be amplified or otherwise conditioned to interface with the micro-controller. One aspect of this embodiment is that the micro-controller is knows the value that is provided when it is 'read' by an RFID reader.

This allows the programmable display tag to be 'read' by an RFID reader as well as be 'read' by a 802.15.4 base station. Thus, a RFID tag with a particular value is integrated with the programmable display tag wherein the programmable display tag also stores the value in the RFID tag. This allows the programmable display tag to be written with data that can be correlated with a particular RFID tag value. This allows infrastructure that can read an RFID tag to access a separate system that can read data associated with the programmable display tag.

An example illustrates the principles of this integration. Assume a programmable display tag with the integrated RFID tag is placed on a crate and used to track the crate in a warehouse. The warehouse may have RFID tag reader that reads the display tag and uses that number to identify the particular crate. Another system can associate other data (e.g., address information, crate contents, etc.) with the RFID value, and upon detecting the entry of the crate into a warehouse by reading the RFID value, a central display management system in response thereto writes data to the programmable display tag. This allows personnel handling the crate to readily determine relevant information without accessing the RFID reader system. Further, the programmable display tag could record information (e.g., temperature values over time, location data over time, date of entry of the system into the warehouse, etc.) or other data written locally by a Display Management System. Then, when the system is removed from the warehouse, the RFID reader detects the removal of the crate, and triggers the Display Management System to cause the data to be read. Alternatively, the personnel handling the crate could interact with the display tag to read when the crate was originally stored. In this manner, data identified by the RFID tag can be correlated with other systems that read or write data to the programmable display tag.

Further, by providing remote portable terminals to personnel handling the crate, they can provide data to be displayed on the display tag. This could indicate who inspected the crate, who loaded it, etc. The programmable display could be a type of visual bill of lading, instructions, or other source of information.

This allows data associated with a RFID tag to be readily visible to personnel handling the item to which the RFID tag is associated with. Typically, such applications involve objects that are large enough that can accommodate a programmable display tag.

Figure 20:
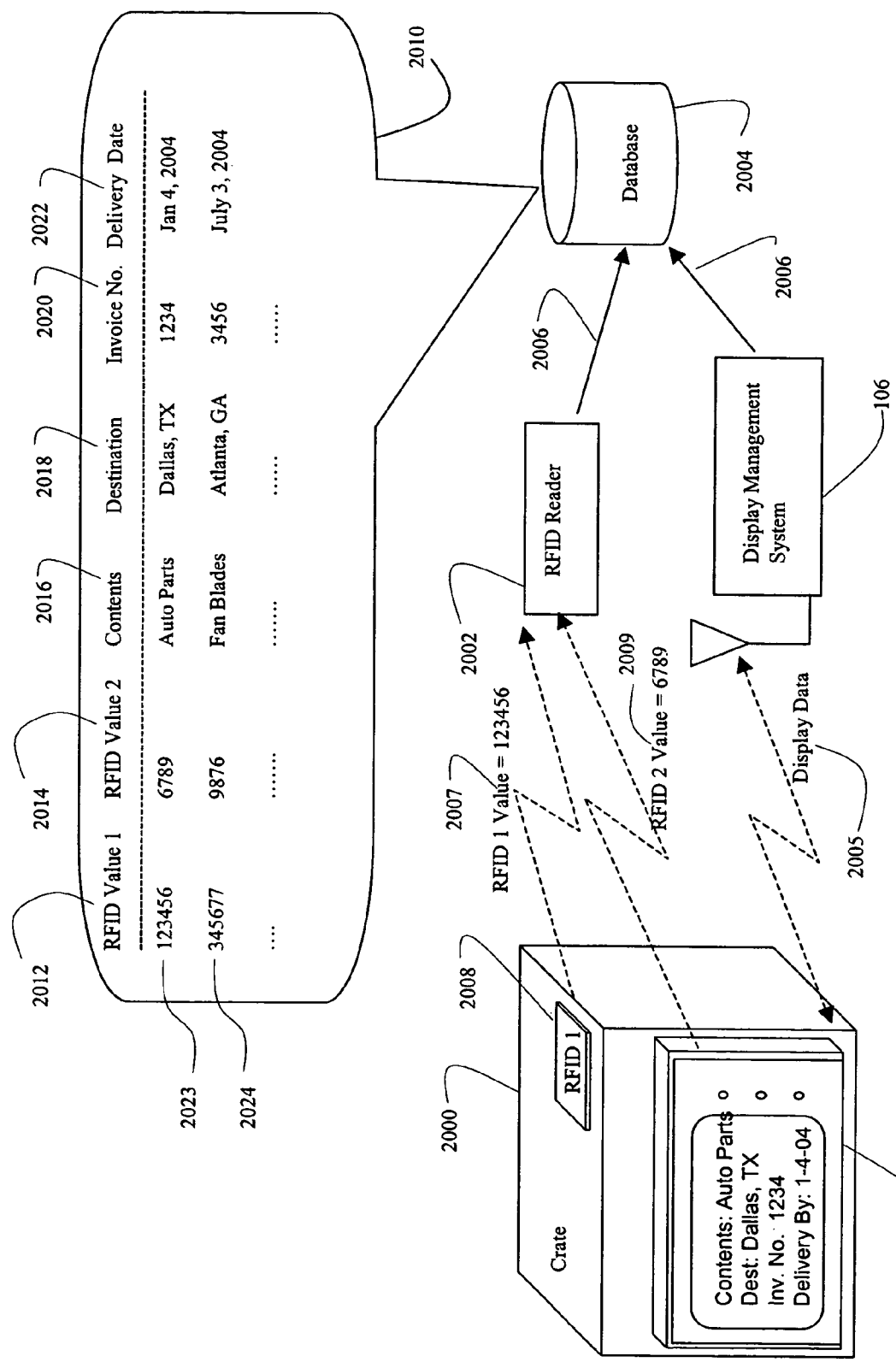
FIG. 20 illustrates one embodiment of a system for using a programmable display tag with an RFID tag.

Another embodiment of the integration of an RFID tag and programmable display tag are illustrated in FIG. 20. In FIG. 20, an item, such as a crate 2000, is presumed to already have an RFID Tag #1 2008 affixed to it. The item may be shipping container or an individual item and the RFID may be permanently attached, or attached after manufacturing. The RFID Tag #1 provides a first RFID tag value to a RFID reader 2002 using existing systems and protocols, which are well known in the art. The RFID Reader 2002 may use a communication link 2006, LAN, or other means to access data in the database 2004. The database may be local and integrated with the RFID reader, or may be a separate system. This arrangement allows various inventory control and industrial processing and handling to be facilitated as is well known in the art. The Database 2004 may comprise a file 2010 containing records of various items. In this embodiment, the record contains a RFID Value #1 2012 corresponding to the value of the RFID Tag #1 2007 read by the reader. The record also contains a second RFID value 2014 of which more will be said of shortly. The record also contains a Contents field 2018, an invoice number field 2020, and a Delivery Date field 2022. The format and fields in this record are exemplary, and many other formats and record types can be adapted based on other embodiments, such as for manufacturing records, delivery records, etc. Further, the file is illustrated as having two records 2023, 2024, although typically many more may exist.

The item 2000 to which the first RFID Tag 2008 is attached also has attached a Programmable Display Tag 100. This Programmable Display Tag may be as previously illustrated in FIG. 19 in which it has an integrated RFID Tag associated with it. This is not shown explicitly on the Programmable Display Tag 100 in FIG. 20, but the same RFID Reader 2002 can read the RFID Tag associated with the Programmable Display Device. This value is shown as "RFID 2 Value" 2009. This value has been previously established as associated with RFID Value #1. Specifically, examining the first record 2022 in the database file 2010, the second RFID Value #2 is shown as "6789".

The RFID tag values are typically much longer, and may have a defined structure. In the example illustrated, a limited digit value without any structure is used to illustrate the principles of the present invention. In practice, the RFID values may be many digits, with defines structures for identifying manufacturers, UPC codes, date of manufacturer, etc.

Once the system has identified the item 2000 by RFID Tag #1 2008 and the system has identified the appropriate Programmable Display Tag by detecting the tag's RFID Value #2, then the system (either the RFID Reader, Display Management System, or some other computing system) can then identify any display data 2005 or other data that should be communicated wirelessly to the Programmable Display Tag. For example, in this embodiment, the Display Management System 106 programs data from the record associated with the item, namely the contents, destination, etc. In this manner, instructions or data associated with an item can be displayed.

Figure 21:
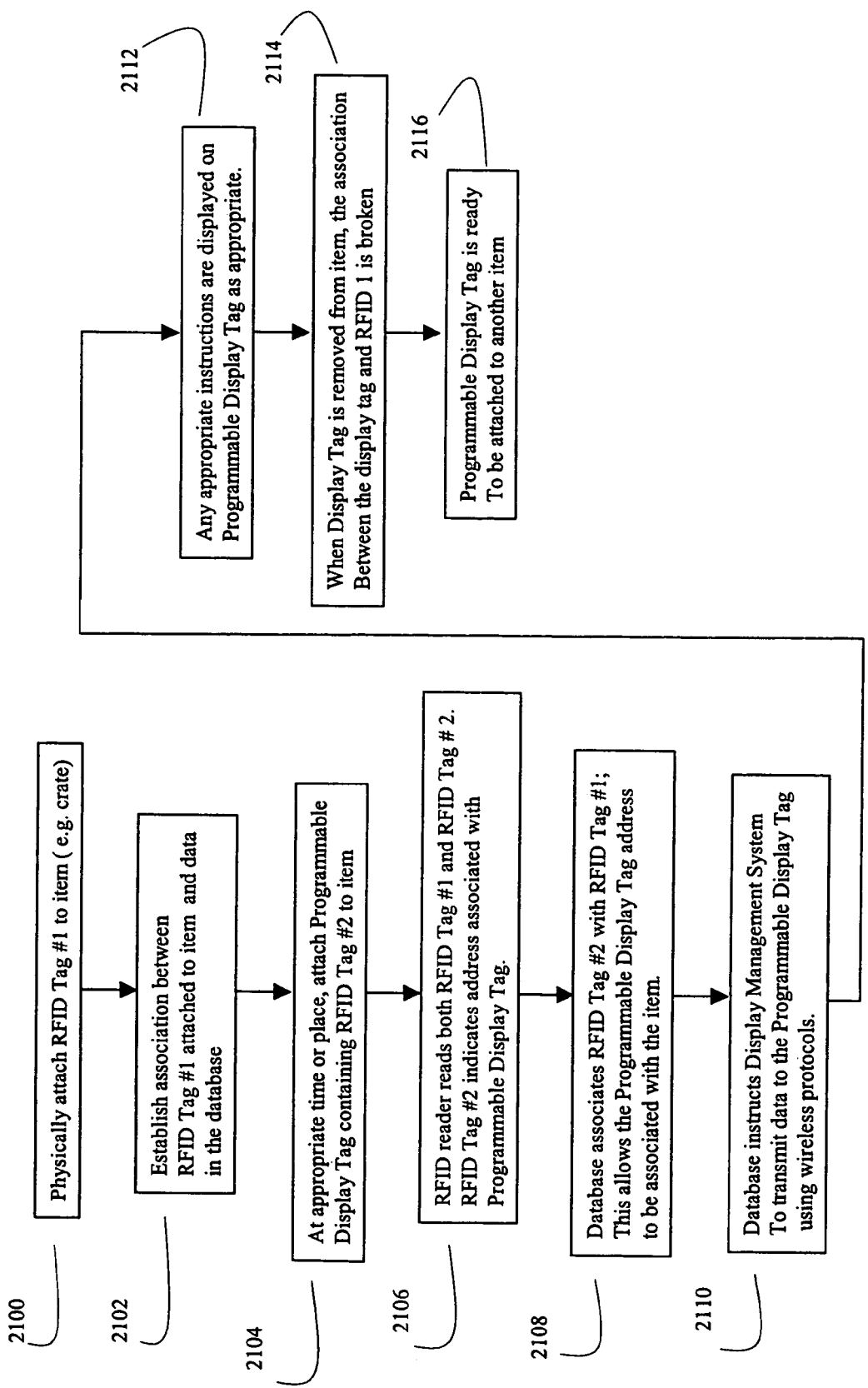
FIG. 21 illustrates one embodiment of the steps for using an RFID tag in conjunction with the programmable display tag.

FIG. 21 illustrates the process associated with this embodiment. In step 2100, the first RFID Tag (#1) is physically attached to the item. This may occur as part of the production or handling of the item, separate from any application of the use of the programmable display tag. Next, in Step 2102, data is associated with the RFID Tag #1; again this process may occur separate and independent from the use of the programmable display tag.

At Step 2014, the Programmable Display Tag is attached to the item. This may occur based on the item entering a location (e.g., warehouse) or at a certain time (e.g., completion of manufacturing). The Programmable Display Tag has associated with it a second RFID Tag (RFID Tag #2). This may be integrated, or a separate RFID tag could be affixed to the Programmable Display Tag. At some point, the database containing the RFID Value #1 is updated to reflect an association with RFID Value. #2. This is shown in Step 2106 by using an RFID reader that reads both values. The system may be constructed so that if both values are read, and one value is previously known (e.g., RFID Value #1), then the system may temporarily associate the second value, RFID Value #2, with the first. Alternatively, the value with the tag can be manually entered into the database, but an automated process is preferable. Further, the RFID Value #2 could be structured so that it contains the MAC address for addressing that particular Programmable Display Tag. Alternatively, the RFID Value #2 could be used to index a separate, database that contains all the communication and address parameters for communicating with that Programmable Display Tag. This is shown in Step 2108.

Once the system (which again, could be the Display Management System, RFID Reader, or a third system) determines the Programmable Display Tag is associated with the item, the system may then communicate various data for the Display Tag to display, which is shown in Step 2110 and these are then displayed on the tag in Step 2112.

The Programmable Display Tag is typically portable, as opposed to being permanently attached to the item. Thus, the Programmable Display Tag is removable, and when removed, the associated between the RFID Value #2 and RFID Value #1 should be terminated. This again, is preferable to be done automatically, but in other instances can be done manually. For example, an RFID Reader reading RFID Tag #1 without detecting RFID Tag #2 may assume that the Display Tag is no longer attached to the item and can terminate the association in Step 2114. At this point, the Programmable Display Tag is ready to be attached to another item as needed in Step 2116.

Another example application may further illustrate this embodiment. Consider an auction house in which goods are passed through a central point for bidding or viewing. Each item has an RFID tag attached to identify the item. As the item is retrieved from storage and placed in the viewing area, a programmable display tag is temporarily placed on the item. A RFID reader detects the item and provides the RFID value to a centralized system. The system retrieves the inventory description and related item information, such as minimum or current bid information. The RFID reader also reads the programmable display tag value and sends that to the centralized system. The system correlates the inventory item with the programmable display, and determines what information is to be sent to the programmable display. The information is then sent to be displayed on the programmable display. In this manner, a programmable display tag is placed in the item, the item is brought to the viewing area, and the pertinent information about the item is automatically display on the display tag for all to see.

Although the above represent several specific embodiments of the claimed invention, the principles of the claimed invention are not intended to be limited to the embodiments indicated in the detailed specification. The principles of the present invention apply to a variety of applications and typically involve, though are not limited to, presenting information, whether graphical, textual, both, or otherwise, whether in still or animated form, by wireless transmitting information to a portable display tag, providing information typically in human readable form, from a display management system. It should be noted that the principles of the present invention do not require all the aforementioned elements to be present, but are only limited according to the claims that follow.

I claim:

1. A programmable display tag comprising:
   a micro-controller executing software for processing a received display protocol message transmitted wirelessly, the display protocol message conveying retail data comprising price data and product description text, the display protocol messages incorporating address data identifying the programmable display tag;
   a wireless interface operatively connected to an antenna receiving radio signals conveying the display protocol message, the wireless interface further operatively connected to the micro-controller and conveying the display protocol message to the micro-controller;
   a memory operatively interfaced with the micro-controller storing the retail data including the price data and the product description text, the memory further adapted to store an address associated with the programmable display tag;
   a display, adapted to receive display signals from the micro-controller indicating the price data and product description text, the display presenting the price data and product description text; and
   a detector configured to detect a presence of one or more individuals, in response to the individuals being in front of the programmable display tag, and wherein the programmable display tag is configured to monitor one or more instances in which the individuals pause or stop in front of the programmable display tag and use data associated with the instances to determine the effectiveness of the price data and the product description text, presented on the display, in capturing attention of one or more consumers.

2. The programmable display tag of claim 1 wherein the wireless interface communicates using a protocol based on the IEEE 802.15.4 wireless communications standard.

3. The programmable display tag of claim 1 wherein both the price data and product description text are associated with an item for sale in a retail store.

4. The programmable display tag of claim 1 wherein the address data identifying the programmable display tag is a Media Access Control (MAC) address.

5. The programmable display tag of claim 1 wherein the display protocol message conveys an indication that is processed by the micro-controller to indicate whether the display protocol message contains retail data or an administrative command.

6. The programmable display tag of claim 1 further comprising a non-rechargeable battery operatively connected to provide power to the micro-controller and the display.

7. The programmable display tag of claim 1 wherein the programmable display tag displays the address associated with the programmable display tag and further comprising a remote terminal that is configured to read the address displayed by the programmable display tag and thereby associate the programmable display tag with an item.

8. A system comprising:
   a display management apparatus comprising:
      a processor executing a first software program controlling the transmission of retail data;
      a memory operatively connected with the processor for storing retail data; and
      a first wireless interface operatively connected to an antenna and the processor receiving retail data from the processor and transmitting the retail data wirelessly; and
   a programmable display tag comprising:

a micro-controller executing a second software program controlling the presentation of retail data;

a memory operatively connected to the micro-controller for storing retail data received from the micro-controller;

a second wireless interface operatively connected to the micro-controller for receiving retail data transmitted from the display management system and providing the retail data to the micro-controller; and a detector configured to detect a presence of one or more individuals, in response to the individuals being in front of the programmable display tag, and wherein the programmable display tag is configured to monitor one or more instances in which the individuals pause or stop in front of the programmable display tag and use data associated with the instances to determine the effectiveness of the price data and the product description text, presented on the display, in capturing attention of one or more consumers.

9. The system of claim 8 wherein the wireless interface is based on an IEEE 802.15.4 wireless interface.

10. The system of claim 8 wherein the retail data comprises price data and product description data.

11. The system of claim 8 wherein the programmable display tag incorporates non-rechargeable batteries as a power source.

12. The system of claim 8 wherein the retail data is transmitted wirelessly by a protocol also conveying formatting data associated with the retail data.

13. The system of claim 8 further comprising a remote terminal comprising:
    a second processor executing a third software program;
    a third wireless interface for receiving retail data transmitted wirelessly from the display management apparatus and providing the retail data to the second processor; and
    a second display controlled by the second processor and receiving the retail data from the second processor, the second display further indicating the received retail data to a user;
    wherein the remote terminal is configured to read an address displayed on the programmable display tag and thereby associate the programmable display tag with an item.

14. The system of claim 8, wherein the processor is configured to utilize the data to generate one or more maps indicating traffic flow of consumers in one or more areas of an entity over time.

15. A method of providing retail data comprising:
    receiving retail information over a communications network, the retail information including retail price data and item identification data, wherein the retail price data is associated with the item identification data;
    storing the retail information in an inventory database, the inventory database comprising a plurality of inventory records wherein each inventory record comprises retail price data, item identification data, and item description data;
    storing in the inventory database an address of a programmable display tag associated with the item identification data;
    retrieving the retail price data and the item description data stored in the inventory database;
    transmitting the retail price data and the item description data using a wireless communications protocol wherein the wireless communications protocol further comprises the address of the programmable display tag;
    receiving the retail price data and the item description data at the programmable display tag;
    storing the retail price data and the item description data in a memory in the programmable display tag;
    presenting the retail price data and the item description data on a display of the programmable display tag; and
    detecting a presence of one or more individuals, in response to the individuals being front of the programmable display tag, and wherein the programmable display tag is configured to monitor one or more instances in which the individuals pause or stop in front of the programmable display tag and use data associated with the instances to determine the effectiveness of the price data and the product description text, presented on the display, in capturing attention of one or more consumers.

16. The method of claim 15 wherein the programmable display tag is located in the proximity of an item wherein the item is described by the item description data.

17. The method of claim 16 wherein the retail price data and the item description data are transmitted using an IEEE 802.15.4 based wireless protocol.

18. The method of claim 17 wherein the retail price data and the item description data are transmitted using an IEEE 802.15.4 protocol that includes relaying the retail price data and the item description data wirelessly from one network node to another network node.

19. A method of updating a programmable display tag comprising:
    providing updated price data to a portable terminal by a user;
    providing an identifier associated with the programmable display tag to the portable terminal by the user;
    transmitting the updated price data and the identifier by the portable terminal to a display management system, the display management system configured for communicating with the programmable display tag;
    storing the updated price data in a database record associated with the identifier;
    transmitting the updated price data from the display management system to the programmable display tag;
    sending a first message from the programmable display tag to the display management system confirming receipt of the updated price data; and
    detecting a presence of one or more individuals, in response to the individuals being in front of the programmable display tag, and wherein the programmable display tag is configured to monitor one or more instances in which the individuals pause or stop in front of the programmable display tag and use data associated with the instances to determine the effectiveness of the price data and the product description text, presented on the display, in capturing attention of one or more consumers.

20. The method of claim 19 further comprising sending a second message from the display management system to the portable terminal confirming the updating of the price data on the programmable display tag.

21. The method of claim 19 wherein the transmitting of the updated price data from the display management system to the programmable display tag is accomplished using an IEEE 802.15.4 wireless communications protocol.

* * * * *